United States Patent
Araki et al.

(10) Patent No.: US 10,635,241 B2
(45) Date of Patent: Apr. 28, 2020

(54) COORDINATE DETECTION DEVICE AND COORDINATE DETECTION METHOD

(71) Applicants: ALAB INC., Tokyo (JP); KONAMI DIGITAL ENTERTAINMENT CO., LTD., Tokyo (JP)

(72) Inventors: Masayuki Araki, Tokyo (JP); Tatsuya Sugawara, Tokyo (JP); Hajime Takahama, Tokyo (JP)

(73) Assignees: ALAB INC., Tokyo (JP); KONAMI DIGITAL ENTERTAINMENT CO., LTD., Tokyo (JP)

( * ) Notice: Subject to any disclaimer, the term of this patent is extended or adjusted under 35 U.S.C. 154(b) by 88 days.

(21) Appl. No.: 15/737,736

(22) PCT Filed: Jun. 10, 2016

(86) PCT No.: PCT/JP2016/067431
§ 371 (c)(1),
(2) Date: Dec. 18, 2017

(87) PCT Pub. No.: WO2016/204095
PCT Pub. Date: Dec. 22, 2016

(65) Prior Publication Data
US 2018/0196541 A1   Jul. 12, 2018

(30) Foreign Application Priority Data

Jun. 19, 2015   (JP) .................. 2015-124207

(51) Int. Cl.
*G06F 3/041*   (2006.01)
*G06F 3/043*   (2006.01)
*G06F 3/0354*   (2013.01)

(52) U.S. Cl.
CPC ............ *G06F 3/043* (2013.01); *G06F 3/0354* (2013.01); *G06F 3/0433* (2013.01)

(58) Field of Classification Search
CPC ....................................................... G06F 3/04
See application file for complete search history.

(56) References Cited

U.S. PATENT DOCUMENTS

| | | | |
|---|---|---|---|
| 2002/0135570 A1 | 9/2002 | Iisaka et al. | |
| 2004/0133366 A1* | 7/2004 | Sullivan | G06F 3/0418 |
| | | | 702/56 |

(Continued)

FOREIGN PATENT DOCUMENTS

| JP | 2002351614 A | 12/2002 |
|---|---|---|
| JP | 2004534329 A | 11/2004 |
| JP | 2013196446 A | 9/2013 |

OTHER PUBLICATIONS

ISA Japan Patent Office, International Search Report Issued in Application No. PCT/JP2016/067431, dated Aug. 2, 2016, WIPO, 2 pages.

*Primary Examiner* — Joseph R Haley
(74) *Attorney, Agent, or Firm* — McCoy Russell LLP

(57) ABSTRACT

[Problem] To detect touch coordinates, without detection errors and without using a special pen, on a substrate such as a touch panel. [Solution] This coordinate detection method comprises: calculating a ratio between the short-term average (STA) and long-term average (LTA) of output signals from at least three vibration detectors installed apart from each other at predetermined distances on a substrate which has a uniform thickness and is made from a homogeneous material that allows the propagation speeds of oscillating waves to be constant; calculating, as arrival times, the times at which the STA/LTA ratio of the three vibration detectors by oscillating waves generated by touching the substrate exceeds a predetermined threshold value; and calculating touch position coordinates on the basis of each of the arrival times, the propagation speed of the (Continued)

oscillating waves, and the distances at which the three vibration detectors are spaced apart from each other.

18 Claims, 10 Drawing Sheets

(56) References Cited

U.S. PATENT DOCUMENTS

| | | |
|---|---|---|
| 2004/0173389 A1 | 9/2004 | Sullivan |
| 2011/0025649 A1* | 2/2011 | Sheikhzadeh Nadjar .................. G06F 3/043 345/177 |
| 2015/0310592 A1* | 10/2015 | Kano ....................... H04N 1/58 382/167 |

* cited by examiner

[FIG. 1]
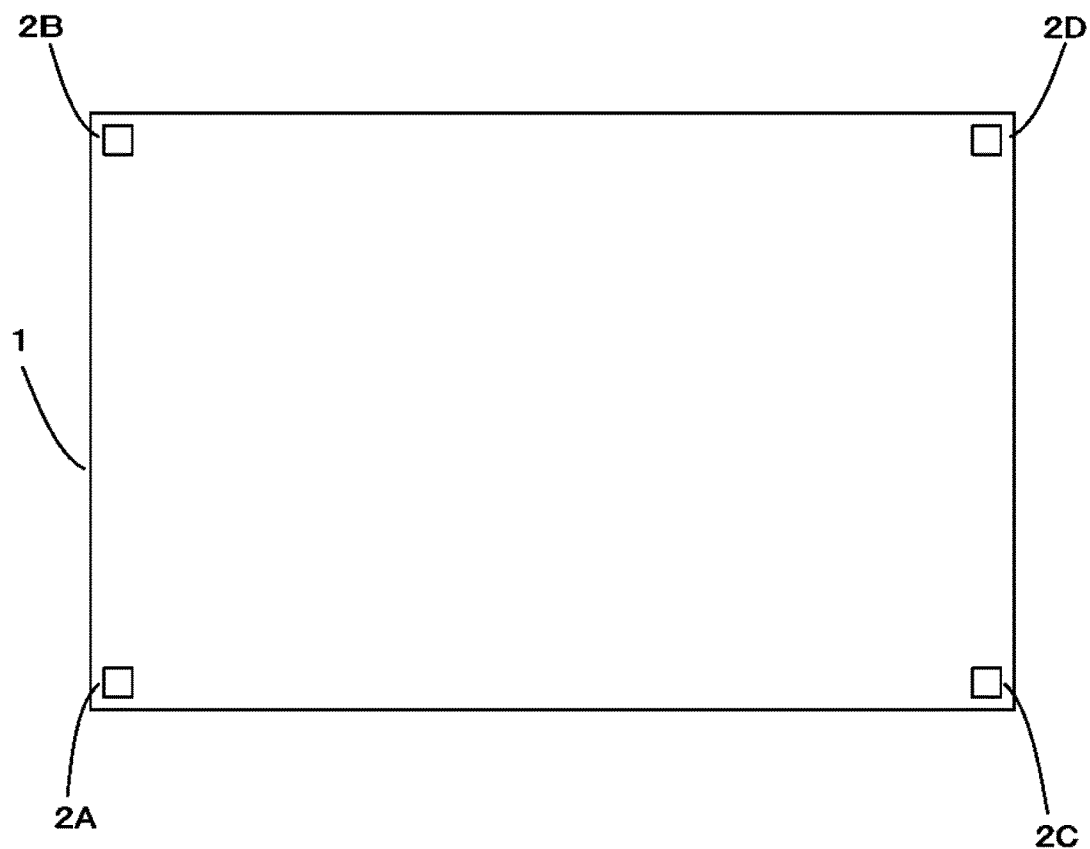

[FIG. 2]
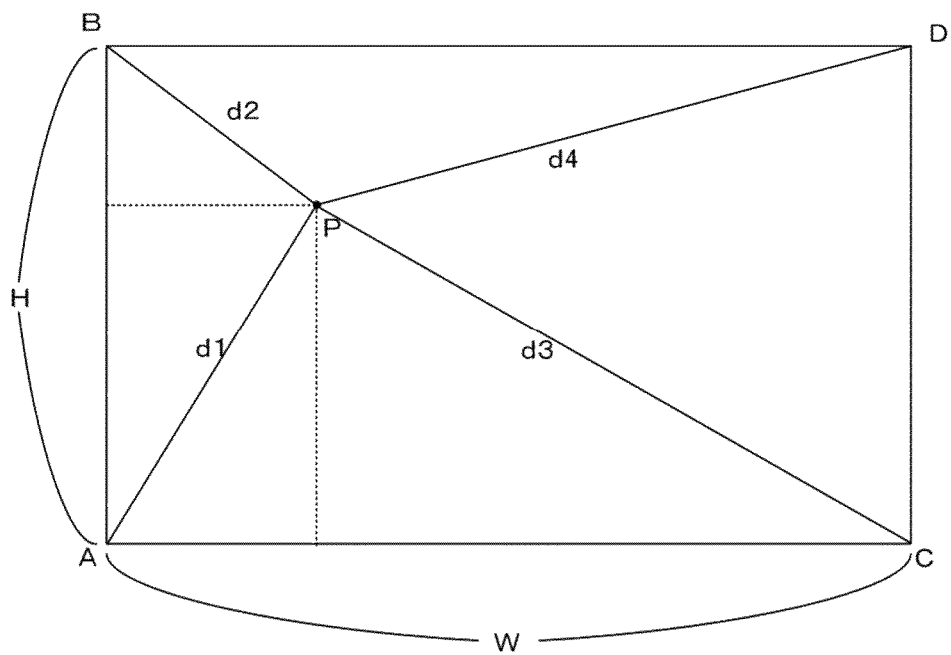

[FIG. 3]
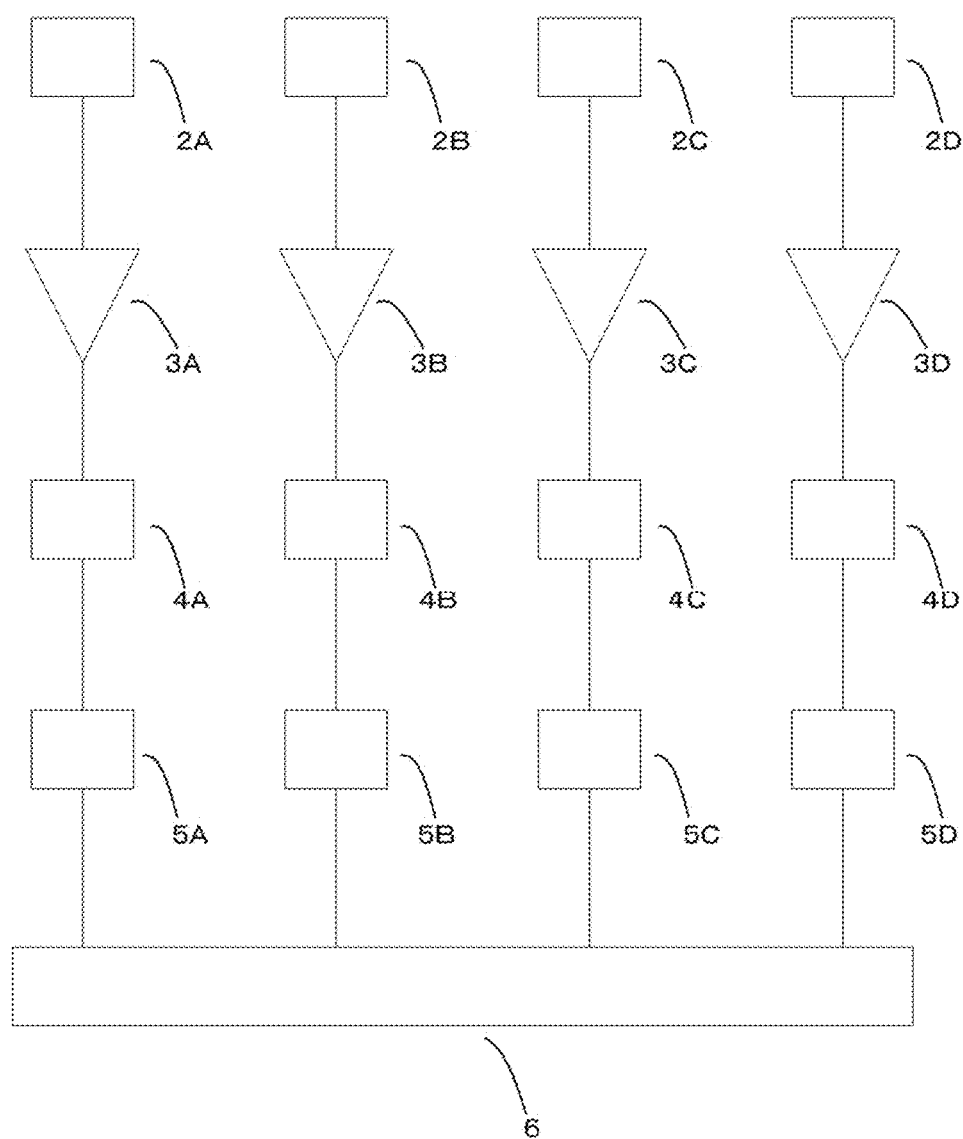

[Fig.4]
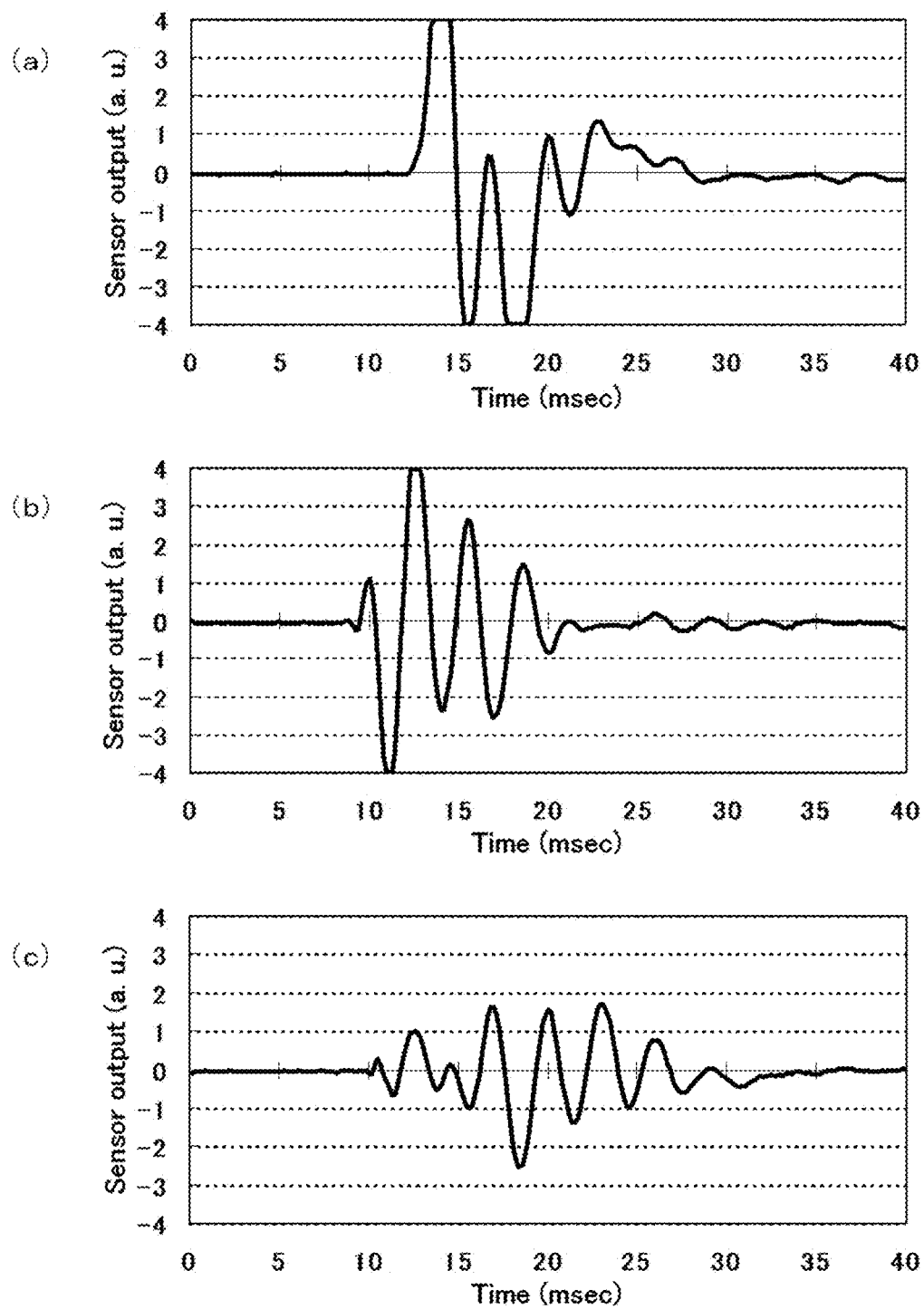

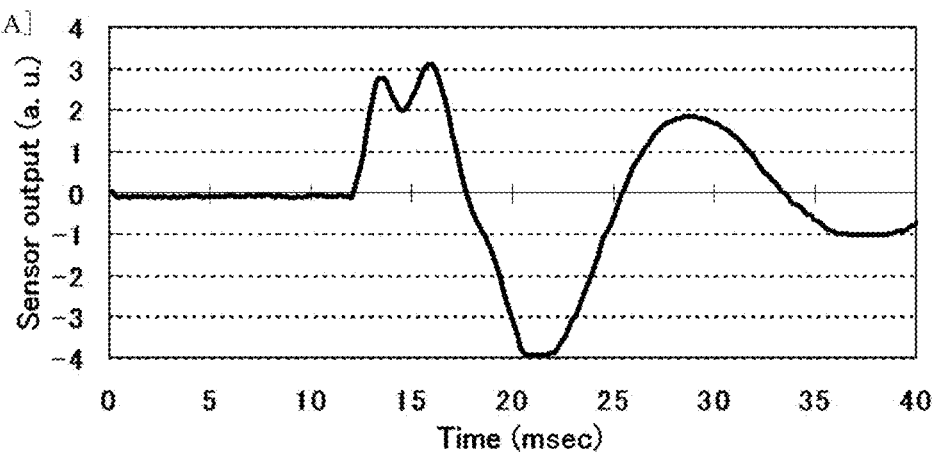
[FIG. 5A]
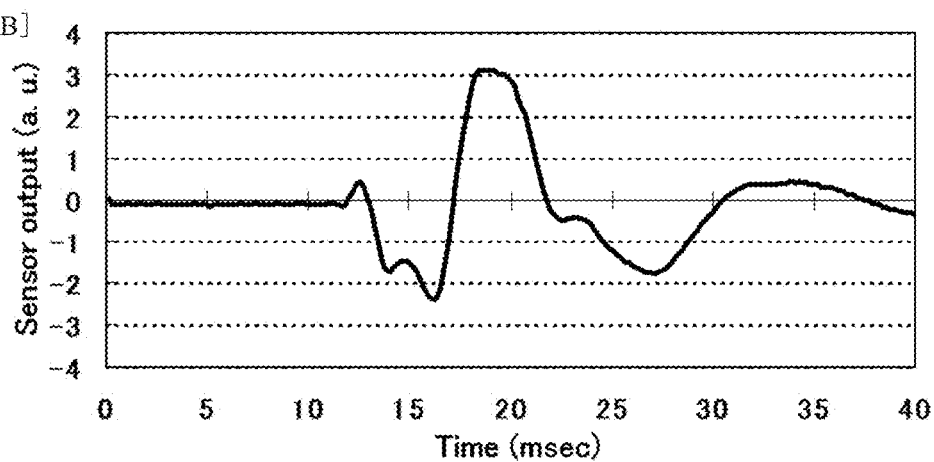
[FIG. 5B]
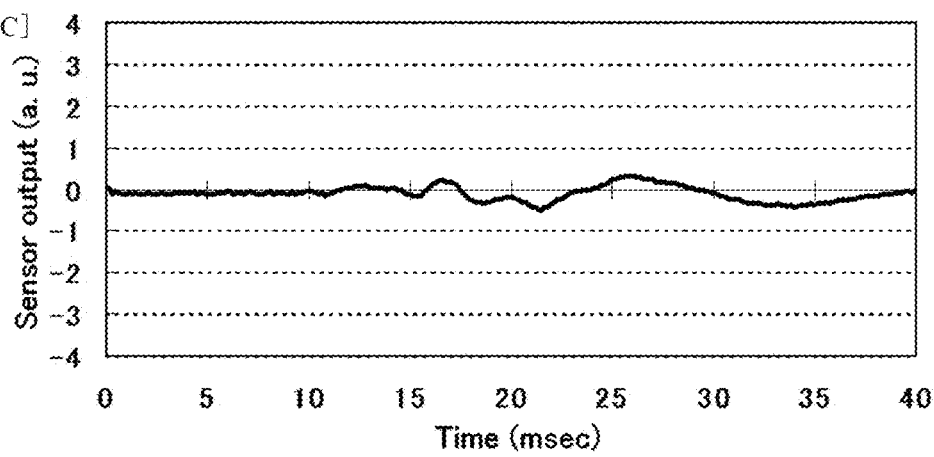
[FIG. 5C]

[Fig. 6]
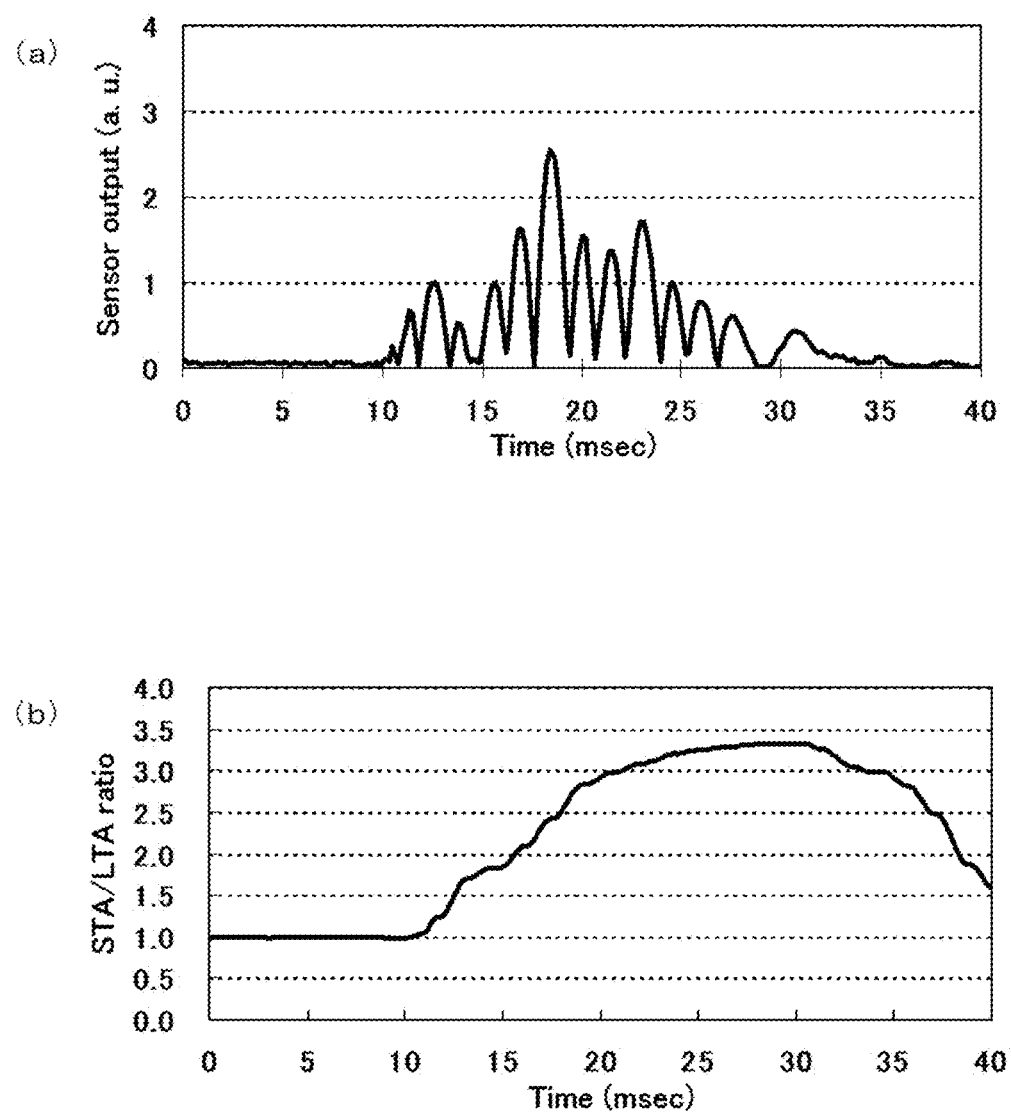

[Fig. 7]
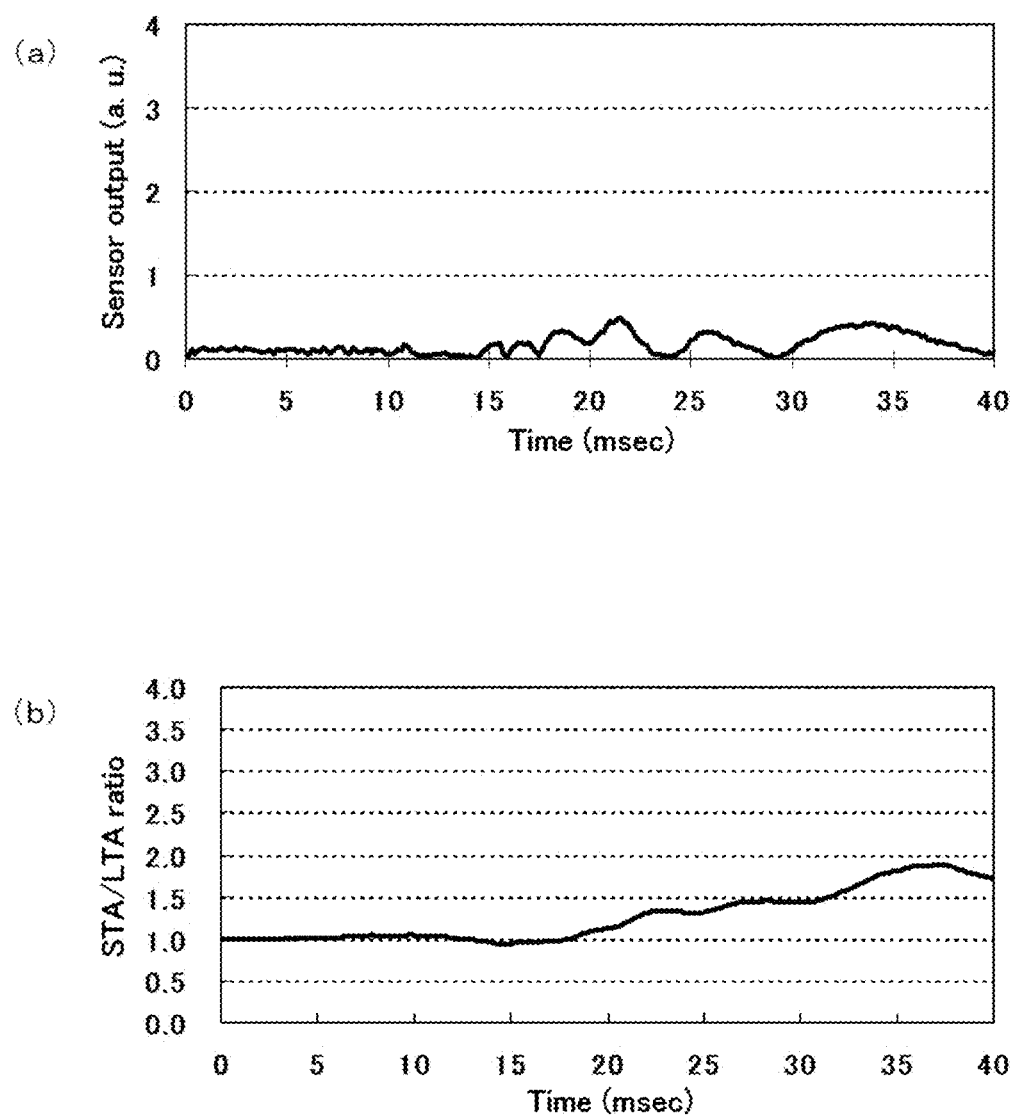

[FIG. 8]
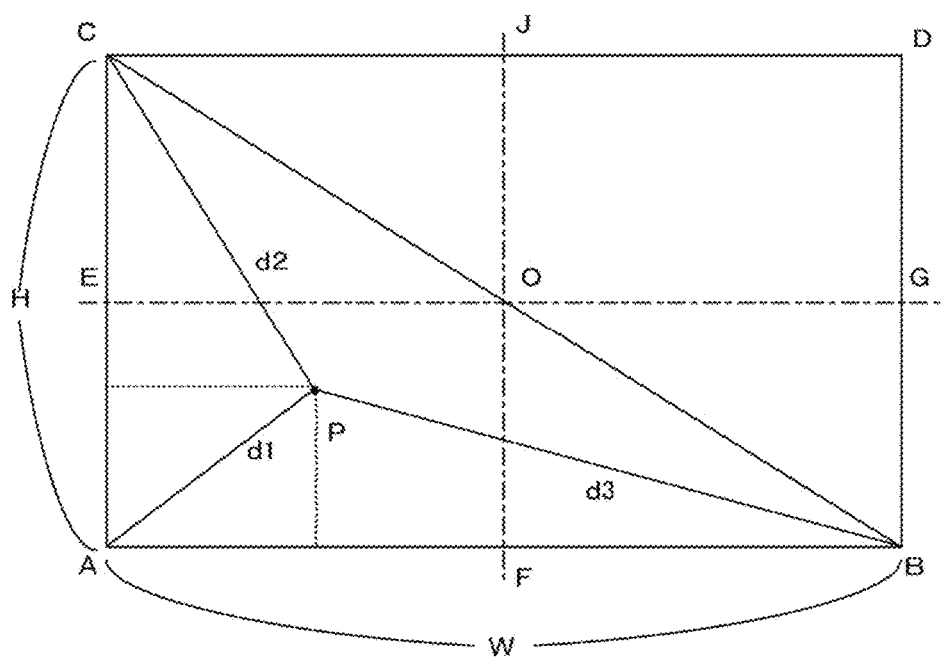

[FIG. 9]
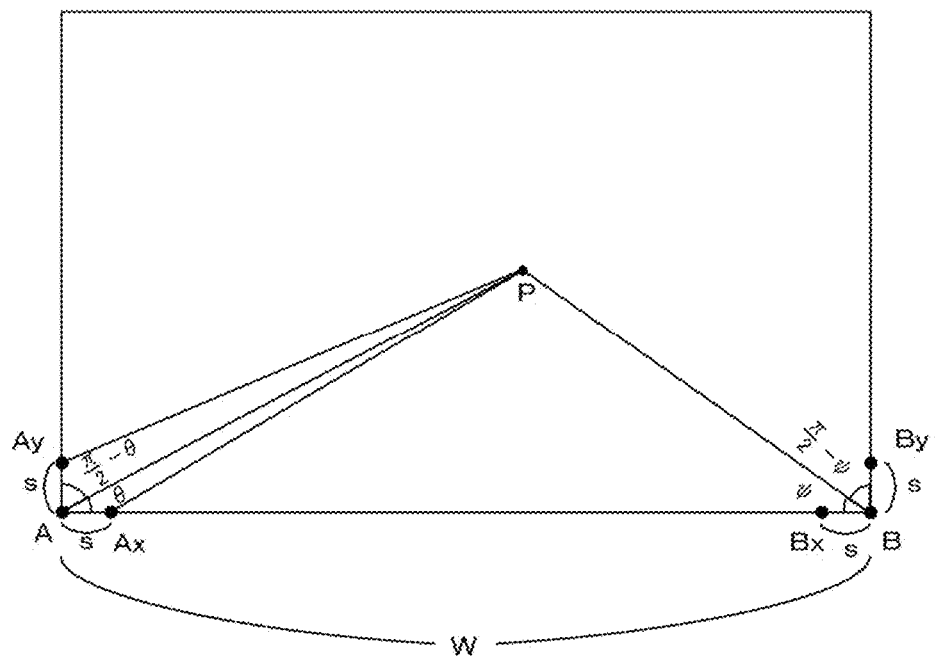

[FIG. 10A]
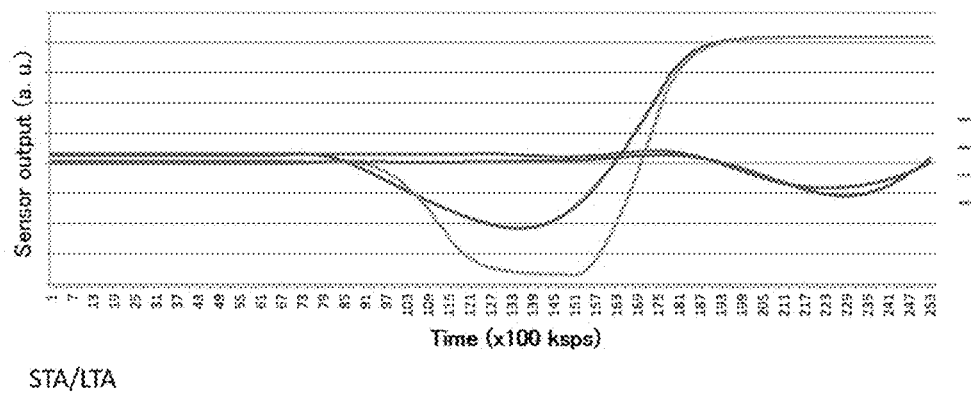
STA/LTA
[FIG. 10B]
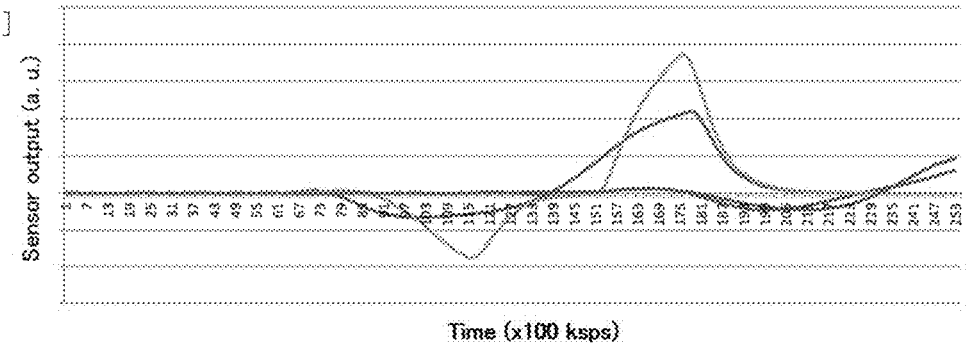
[FIG. 10C]
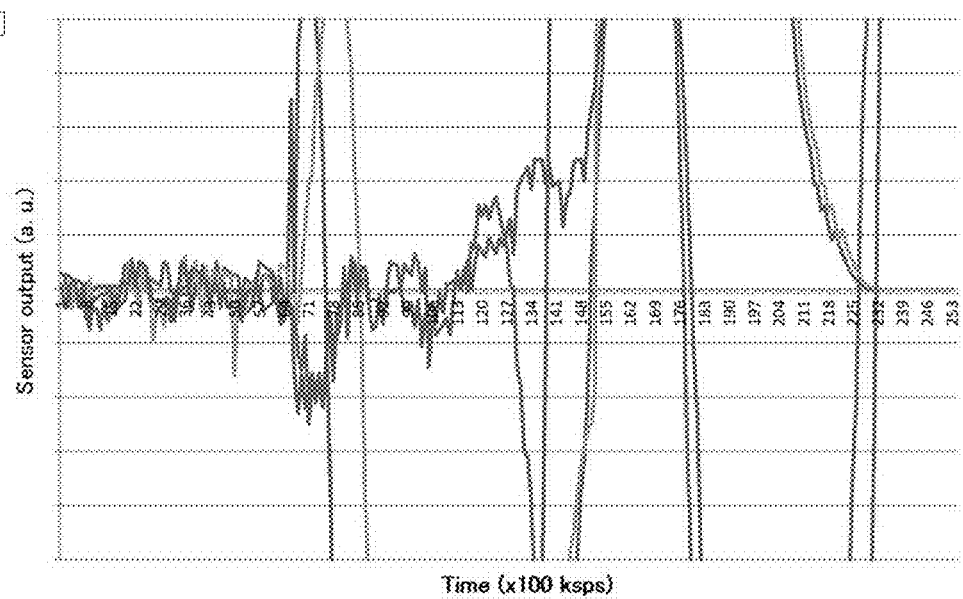

COORDINATE DETECTION DEVICE AND COORDINATE DETECTION METHOD

CROSS-REFERENCE TO RELATED APPLICATIONS

The present application is a U.S. National Phase of International Patent Application Serial No. PCT/JP2016/067431, entitled "COORDINATE DETECTION DEVICE AND COORDINATE DETECTION METHOD," filed on Jun. 10, 2016. International Patent Application Serial No. PCT/JP2016/067431 claims priority to Japanese Patent Application No. 2015-124207, filed on Jun. 19, 2015. The entire contents of each of the above-cited applications are hereby incorporated by reference in their entirety for all purposes.

TECHNICAL FIELD

The present invention relates to a coordinates detection device and a coordinates detection method, utilizing a hypocenter estimation method.

BACKGROUND ART

Broadly used as a coordinates input device for various types of electronic equipment including a tablet terminal, a smartphone and the like is a so-called "touch panel type coordinates input device" (hereinafter referred to as "a touch panel"), which enables an input to be made with a finger or a touch stylus pen touching (contacting) a display screen.

There are some touch panel type input devices based on capacitive sensing, resistivity variations and the like known in the art (see Patent Literature 1 and 2 as stated below), all of which principally have a sensor capable of detecting a touched coordinate position incorporated typically in the display itself.

One of the problems with this type of touch panel input devices includes that they do not allow the touch panel functionality to be added in a retrofit manner to a screen with no such touch panel functionality provided originally, such as, a monitor screen having only a displaying functionality, and a screen projected by using a projector and the like.

A method using an oscillating stylus pen has been proposed, which can work as well with the display panel equipped with no such special input functionality in the display itself, wherein the coordinates being input may be determined by a detected oscillation. This method allows for the computation of the input position by touching the panel with an input stylus pen having an oscillator that oscillates at a specific frequency; and computing an arrival time from a driving signal of the oscillator of the stylus pen and a detected waveform from an oscillation detector in synch with the oscillator so as to compute the input position.

CITATION LIST

Patent Literature

Patent Literature 1: Japanese Unexamined Patent Application Publication No. 2002-351614
Patent Literature 2: Japanese Translation of PCT International Application Publication No. JP-T-2004-534329

SUMMARY OF INVENTION

Technical Problem

However, the method using the oscillating stylus pen requires "a special input stylus pen" with an oscillator having a predetermined specific oscillation frequency, or otherwise will make it difficult to separate an oscillatory waveform generated by a touch clearly from background noise in case of touching with a finger or an ordinary stylus pen having no oscillator. The reason for this may be explained as below.

The oscillatory wave generated by an impact upon touching with a finger or an ordinary stylus pen may contain different frequencies. On the other hand, because a propagation velocity of the oscillatory wave varies depending on the frequencies, and a signal of the oscillatory wave will change its waveform proportionally as the distance between the touched position and the oscillation detector (e.g. an acceleration sensor) for detecting the oscillatory wave increases, thus to be much broader in shape, or the signal having a wider spread with respect to time. Additionally, the oscillatory wave spread in a two-dimensional plane will diffuse its energy, and thus, the amplitude of the oscillatory wave will become smaller at a point farther from the touched position. Consequently, the output signal from the oscillation detector will be also smaller and thus more difficult to be separated from the background noise.

The above consideration will lead to a conclusion that if a determination is made as to the presence of detected oscillation by setting a threshold for the signal waveform directly from the output of the oscillation detector or its envelope waveform, then there will be an increased risk of bad detection or false detection. In this regard, some input methods have been reported to suggest that a plurality of oscillation detectors be disposed at respective positions near the display (panel), wherein the two-dimensional coordinates of the touched locations will be determined based on the oscillatory waveform received at each of the oscillation detectors and the time of its detection, although none of these methods can provide a reliable coordinates detection by avoiding the false detection, because in these methods, the coordinates calculation is directly based on the raw data, such as acceleration data, for example.

Conversely, yet with the provision that oscillation detecting devices, such as acceleration sensors, be disposed at a plurality of different locations on the touch panel, if the sensitivity for separate detection of the waveform from the background noise could be enhanced in every oscillation detector, then the coordinates being input, even if with a finger or an ordinary stylus pen, would still be determined accurately.

However, there is a need for computing a distance to the touched position from each of the oscillation detectors to identify the coordinates being input with a finger or an ordinary stylus pen, and as it is, determining the oscillation detection time at each of the oscillation detectors will be critical, wherein in the process of determining, equivalent capacity of time resolution must be ensured for every oscillation detector. The reason for this is that the time resolution may affect directly to the space resolution in the touched position determination.

The present invention has been made in the light of the above circumstances, and its primary object is to provide a coordinates detection device and a coordinates detection method that may allow for a reliable coordinates detection by avoiding a false detection.

Solution to Problem

Based on the finding for an impact waveform generated by a touch that the STA/LTA method is effective in an output signal detection at an oscillation detector for detecting the coordinates of that impact waveform, the present invention provides an optimal technique for such coordinates detection to thereby accomplish a fast and accurate detection of the touched position with high reliability. In addition, an object on which the coordinates are to be detected is not limited to what is traditionally referred to as a touch panel but can include generally plate-like entities, such as a wall surface, and a floor surface, or a substrate as well as a spherical surface, wherein a coordinates detection device can be constructed by an oscillation detector which may be not only placed on a traditional touch panel but also on the wall surface, the floor surface, the spherical surface and the like.

One of the embodiments of a coordinates detection method according to the present invention includes the following steps:

respectively determining a STA/LTA ratio to each of output signals from at least three oscillation detectors (2A, 2B, 2C) located apart from each other by a predetermined distance on a substrate (1) comprised of a homogeneous material having a constant thickness, the STA/LTA ratio representing a ratio of a short term average to a long term average, wherein each of the short term average and the long term average has its own predetermined cumulative time as being set;

respectively determining, as an arrival time (Ta, Tb, Tc), a time when each of the STA/LTA ratios for said at least three oscillation detectors has exceeded a predetermined threshold from an oscillatory wave generated by touching said substrate (1); and determining touched position coordinates from said respective arrival times, a propagation velocity (V) of the oscillatory wave, and the spacing between the locations of said at least three oscillation detectors (2A, 2B, 2C).

The STA/LTA method, as used herein, refers to a technique applied to a signal waveform detected by an oscillation detector, wherein a Long Term Average and a Short Term Average are computed and an oscillation is determined to have arrived at the oscillation detector when the STA/LTA ratio has reached a predetermined threshold or above.

The coordinates detection method as described above may further include the step of determining the propagation velocity (V) of the oscillatory wave beforehand with said at least three oscillation detectors (2A, 2B, 2C). In addition, an optimal cumulative time for said short term average and said long term average may be configured to be automatically set through calibration.

The propagation velocity of the oscillatory wave configured to be automatically measured in the preceding calibration allows a distance from the touched position to the oscillation detector to be computed from a difference between the arrival times. Optimizing the STA term and the LTA term in the preceding calibration may further enhance the reliability in avoiding the false detection.

In the coordinates detection method as described above, a plurality of different cumulative times may be prepared beforehand for said short term average and said long term average, so that the touched coordinates, which correspond to various cumulative times, may be computed, depending on the output result by said touching.

In the coordinates detection method as described above, the candidates of cumulative time for the short term average and the long term average are prepared beforehand, so that in event of detection error, recalculation can be carried out automatically to compute the touched coordinates, thereby enhancing the reliability further more.

Another embodiment of a coordinates detection method according to the present invention includes the following steps:

respectively determining a STA/LTA ratio to each of output signals from four oscillation detectors (2A, 2B, 2C, 2D) located apart from each other by a predetermined distance on a substrate 1 comprised of a homogeneous material having a constant thickness, the STA/LTA ratio representing a ratio of a short term average to a long term average, wherein each of the short term average and the long term average has its own predetermined cumulative time as being set;

respectively determining from an oscillatory wave generated by touching said substrate, a time (Ta, Tb, Tc, Td) when each of the STA/LTA ratios for said four oscillation detectors has exceeded a predetermined threshold;

respectively determining, from each of said times, a required time taken for said oscillatory wave to reach from the touched position to each of the four oscillation detectors; and determining touched position coordinates from said respective required times, a propagation velocity (V) of the oscillatory wave, and information on the locations of three out of said four oscillation detectors.

In this way, using the four oscillation detectors allows for ready computation of the amount of time taken for the wave to reach from the touched position to the oscillation detectors. This allows the touched coordinates to be computed exclusively by simple four operations: addition, subtraction, multiplication and division, which can simplify a construction of the system and thus realize a reduced cost yet with high precision.

Another embodiment of a coordinates detection method according to the present invention includes the following steps:

respectively determining a STA/LTA ratio to each of output signals from four oscillation detectors (2A, 2B, 2C, 2D) located apart from each other by a predetermined distance on a substrate comprised of a homogeneous material having a constant thickness, the STA/LTA ratio representing a ratio of a short term average to a long term average, wherein each of the short term average and the long term average has its own predetermined cumulative time as being set;

respectively determining from an oscillatory wave generated by touching said substrate, a time (Ta, Tb, Tc, Td) when each of the STA/LTA ratios for said four oscillation detectors has exceeded a predetermined threshold;

respectively determining, from each of said times, a required time taken for said oscillatory wave to reach from the touched position to each of the four oscillation detectors; and determining touched position coordinates from said respective required times, and information on the locations of said four oscillation detectors.

In this way, using the four oscillation detectors allows for the touch coordinates to be computed without determining the propagation velocity of the oscillatory wave beforehand through such as calibration.

Another embodiment of a coordinates detection method according to the present invention includes the following steps:

respectively determining a STA/LTA ratio to each of output signals from four oscillation detectors (2A, 2B, 2C, 2D) located respectively at the apexes of a rectangle having predetermined lengths of sides thereof on a substrate (1) comprised of a homogeneous material having a constant thickness, the STA/LTA ratio representing a ratio of a short term average to a long term average, wherein each of the short term average and the long term average has its own predetermined cumulative time as being set;

respectively determining from an oscillatory wave generated by touching said substrate (1), a time (Ta, Tb, Tc, Td) when each of the STA/LTA ratios for said four oscillation detectors has exceeded a predetermined threshold;

discriminating, based on said times (Ta, Tb, Tc, Td), one among said four oscillation detectors (2A, 2B, 2C, 2D) at which the oscillatory wave has arrived earliest;

discriminating a quadrant of said rectangular that contains as the apex the location of said one oscillation detector (2A) at which said oscillatory wave has arrived earliest; and selecting three (2A, 2B, 2C) out of said oscillation detectors according to the sequence of the times when the oscillatory wave has arrived, and determining touched position coordinates from the locations where said three oscillation detectors are located and the times when said three oscillation detectors detect the oscillatory wave.

In this way, dividing the substrate into four quadrants, and discriminating the quadrant containing the touched position for computing the touched position coordinates enables the detection of touched position coordinates in a reliable manner.

Another embodiment of a coordinates detection method according to the present invention includes the following steps:

respectively determining a STA/LTA ratio to an output signal from each of oscillation detectors in a first incident direction detecting module and a second incident direction detecting module located apart from each other by a predetermined distance on a substrate (1) comprised of a homogeneous material having a constant thickness, the STA/LTA ratio representing a ratio of a short term average to a long term average, wherein each of the short term average and the long term average has its own predetermined cumulative time as being set, each of said first and second incident direction detecting modules being comprised of three oscillation detectors;

respectively determining from an oscillatory wave generated by touching said substrate (1), a time when each of the STA/LTA ratios for said three respective oscillation detectors in said first and second respective incident direction detecting modules has exceeded a predetermined threshold;

respectively computing, from each of said times, first and second angles for the incidence of the oscillatory wave upon said first and second incident direction detecting modules; and computing touched position coordinates from said first and second angles and the coordinates of said first and second incident direction detecting modules.

In this way, using two modules for detecting the incident directions of the oscillatory wave allows for computing the touched position coordinates by simple operations.

It is to be noted that in the coordinates detection method as described above, the substrate may comprise a curved surface having a predetermined curvature. It means that the substrate may not be limited to a flat surface but may include any curved surface. The present invention allows for the detection of touched coordinates even on the curved surface, such as a spherical surface, for example. In this case, polar coordinates may be used in the coordinate calculation to simplify the calculating process.

Advantageous Effects of Invention

The touched position detection device according to the present invention which uses the STA/LTA method in order to avoid the false detection may have a broad applicability wherein the coordinates detection may be accomplished simply by touching without using any special input stylus pen, such as one having a characteristic oscillation mode.

BRIEF DESCRIPTION OF DRAWINGS

FIG. 1 is a schematic diagram showing a layout of oscillation detectors on a substrate (touch panel) in a coordinates detection device according to the present invention;

FIG. 2 is a plan view illustrating physical relationship between a touched position and the oscillation detectors in the coordinates detection device according to the present invention;

FIG. 3 is a system block diagram of a coordinates detection device of the present invention;

FIGS. 4A, 4B, and 4C are graphical representations illustrating time dependency of output signals from oscillation detectors when a substrate (touch panel) is touched with a fingernail in a coordinates detection device according to the present invention;

FIGS. 5A, 5B, and 5C are graphical representations illustrating time dependency of output signals from oscillation detectors when a substrate (touch panel) is touched with a finger in a coordinates detection device according to the present invention;

FIG. 6A is a graphical representation illustrating time dependency of an absolute value for an output signal from an oscillation detector when a substrate (touch panel) is touched with a fingernail in a coordinates detection device according to the present invention, and FIG. 6B is a graphical representation illustrating time dependency of a STA/LTA ratio when a substrate (touch panel) is touched with a fingernail in a coordinates detection device according to the present invention;

FIG. 7A is a graphical representation illustrating time dependency of an absolute value for an output signal from an oscillation detector when a substrate (touch panel) is touched with a finger in a coordinates detection device according to the present invention, and FIG. 7B is a graphical representation illustrating time dependency of a STA/LTA ratio when a substrate (touch panel) is touched with a finger in a coordinates detection device according to the present invention;

FIG. 8 is a plan view showing a layout of oscillation detectors and a touched position in another embodiment of a coordinates detection device according to the present invention;

FIG. 9 is a plan view showing a layout of oscillation detectors and a touched position in another embodiment of a coordinates detection device according to the present invention; and FIGS. 10A, 10b, and 10C are graphical representations illustrating time dependency of output signals from oscillation detectors when a substrate (touch panel) is touched with a finger in a coordinates detection device according to the present invention, wherein FIG. 10A is a graphical representation of raw data when touching at one point on a glass plate having four sensors disposed thereon (vertical axis representative of any memory, while horizontal axis indicating time), FIG. 10B is a graphical representation showing results of the STA/LTA ratios determined from the data in FIG. 10A, and FIG. 10C is an enlarged graphical representation from FIG. 10B.

DESCRIPTION OF EMBODIMENTS

Embodiments of the present invention will now be described respectively with reference to the drawings. It is to be noted that like or similar components are indicated by like reference signs or by like reference signs with just additional characters as modified in order to eliminate any duplicated explanation, however the description of each of the embodiments should be construed purposely for understanding the technical idea of the present invention and not be taken in a sense of limiting to the description of the embodiments.

First Embodiment

FIG. 1 is a schematic diagram showing a layout of oscillation detectors (e.g. acceleration sensors). The reference numeral 1 indicates a flattened rectangular substrate having a constant thickness comprised of a homogeneous material, such as, vinyl chloride resin, acrylic resin, silica glass, and alloys, the reference numerals 2A, 2B, 2C, and 2D respectively indicate first, second, third, and fourth oscillation detectors, which are disposed at four corners on the substrate 1.

Physical relationship among those first, second, third, and fourth oscillation detectors are such as shown in FIG. 2. In FIG. 2, characters A, B, C, and D stand for the locations of the first, second, third, and fourth oscillation detectors 2A, 2B, 2C, and 2D. Specifically, the first, second, third, and fourth oscillation detectors 2A, 2B, 2C, and 2D are located at the corners of the rectangle having lengths of the sides W and H, wherein the distance between the points A and B corresponds to the H, the distance between the points A and C corresponds to the W, the distance between the points C and D corresponds to the H, and the distance between the points B and D corresponds to the W.

In FIG. 2, an orthogonal coordinate system may be defined on the substrate 1, with its origin located at A, Y-axis extending in the linear direction from the A toward the B and X-axis extending in the linear direction from the A toward the C, wherein the coordinates of the points A, B, C, and D can be denoted as (0, 0), (0, H), (W, 0), and (W, H), respectively. Inside the rectangle configured by these points A, B, C, and D, a certain point having been touched (contacted) with a stylus pen or a finger may be represented as P and its coordinates as (x, y). In addition, the distance between the A and the P will be denoted as d1, the distance between the B and the P as d2, the distance between the C and the P as d3 and the distance between the D and the P as d4.

The distance from the P to each of the points A, B, C, and D can be determined from a required time taken for an oscillatory wave generated by an impact of the touching at the point P to reach to each of the points A, B, C, and D and a propagation velocity of the oscillatory wave. In addition, the coordinates of the point P, (x, y), can be determined from respective coordinates of at least three out of the points A, B, C, and D and their respective distances from the point P, which will be described later in connection with the method of computation. Accordingly, once the propagation velocity of the oscillatory wave and said required times have been determined, the coordinates of the P, (x, y), can be calculated.

A technique for determining the arrival of the oscillatory wave at each of the oscillation detectors by utilizing the STA/LTA method will be described below.

A technique for detecting a touch in the present invention comprises determining an absolute value for a waveform signal output from each of the oscillation detectors disposed on the substrate 1, computing a STA/LTA ratio for that absolute value, and comparing the STA/LTA ratio to a threshold, so that the presence or the absence of touching can be detected in each of the oscillation detectors.

While in a static condition with no touching, there will be almost no difference between the STA and the LTA, resulting in the STA/LTA ratio nearly equal to 1. However, when an oscillatory wave is generated at a certain point of time by touching the substrate and thus a rapid variation occurs in a detected waveform in the oscillation detector, the amplitude of the detected waveform will increase in a short period of time, to which the STA will response sensitively to alter its value. On the other hand, the long term average is less sensitive to that variation, and so the value for STA/LTA ratio will be altered from 1 and increasing. When an amount of this increase has exceeded a predetermined threshold, it is determined that the touching has occurred.

<Ingenuity for Implementation>

It is to be understood that translation of the phrase "when the threshold has been exceeded" may include "when the threshold has been exceeded for a certain period of time." The reason why is that while a shorter STA leads to a higher sensitivity, as described above, it is more susceptible to noise. Namely, the reason why is that, if it would be determined that "the touching has occurred" in every case wherein the threshold has been exceeded, there would be a risk that misrecognition is increased under the influence of such noise.

FIG. 10A is a graphical representation of raw data when touching at one point on a glass plate having four sensors disposed thereon (vertical axis representative of any memory, while horizontal axis indicating time); FIG. 10B is a graphical representation showing results of STA/LTA ratios determined from the data in FIG. 10A; and FIG. 10C is an enlarged graphical representation from FIG. 10B. It is to be noted that the horizontal axis corresponds to time, wherein one division on the scale spans 1/100000 second [100 ksps].

In case of much noise as illustrated in FIGS. 10A-10C, in an implementation, the presence of trigger is to be first determined when a certain period of time has been exceeded subsequent to the threshold having been initially exceeded, wherein the time when the touching has occurred is to be a time preceding the current time by that "certain period of time" and thus, noise-tolerant and accurate reading of the rise time of the waveform can be obtained. It is to be noted that since the formula for self-similar is exactly the same as the formula for the STA/LTA (only the location for which the LTA is taken is different), the acceptance of the above translation would not introduce any inconsistency in the description.

However, a too short cumulative time for the STA does not allow for sufficient take-in of a signal having a wider spread with respect to time, and specifically lower signal intensity for the waveform will not achieve the separation from the background noise, while on the contrary if the cumulative time is set longer than necessary, the ratio with respect to STA/LTA will approach 1, making the detection separated from the background noise difficult. Thus, the cumulative time for the short term average must be set adequately.

Besides, the cumulative time for the LTA, which is intended to determine an average of the background noise, must be set to be sufficiently long relative to that for the STA, but undesirably longer cumulative time may lead to a prolonged arithmetic processing, and in the context of cancelling the background noise in the STA computation, a signal at a point of time far apart from the time to be counted for the STA could not be used for the LTA computation.

For example, the cumulative time for the STA and the LTA should be set such that the STA/LTA ratio at the time of touch will exceed the threshold (e.g. 1.5 to 2.0), wherein the optimal value may vary depending on the material or thickness of the substrate, the layout of the oscillation detectors, the condition of the touch to be determined and the like.

In some instances, for the case of touching like quick rapping, the cumulative time for the STA may be set to 20-100 msec, and the cumulative time for the LTA may be set to 200 msec-1 sec, and for the case of contacting the substrate as sliding on the surface following to the touch, the cumulative time for the STA may be set to 100-500 msec, and the cumulative time for the LTA may be set to 500 msec-1 sec. The cumulative time for the STA and the LTA may be selected adaptively for either case. This selection may be accomplished by manual selection, although an optimal value may be automatically selected from the STA/LTA ratio in each case.

FIG. 3 is a system block diagram of a signal processing unit in a touch panel (substrate) of the present invention. Analog signals being output from the first, second, third, and fourth oscillation detectors 2A, 2B, 2C, and 2D due to an oscillatory wave generated by touching the substrate 1 are amplified by first, second third, and fourth preamps 3A, 3B, 3C, and 3D and input to first, second, third, and fourth high-speed A/D converters 4A, 4B, 4C, and 4D (at sampling frequency 100 MHz, for example). The first, second, third, and fourth high-speed A/D converters 4A, 4B, 4C, and 4D convert the input analog signals into digital signals, which are in turn stored in first second, third, and fourth storage devices 5A, 5B, 5C, and 5D. The digital signals stored in the first second, third, and fourth storage devices 5A, 5B, 5C, and 5D may be subject to any necessary arithmetic processing in an arithmetic processor 6. The arithmetic processing will be described below by using specific data by way of example.

FIGS. 4A-4C are graphical representations illustrating time dependency of an output signal from an oscillation detector (e.g., the first oscillation detector 2A) when a substrate is touched with a nail in a fingertip, plotted with the output signal from the oscillation detector as the vertical axis and the time as the horizontal axis. As the distance between the oscillation detector and the touched position increasing in the sequence from FIG. 4A to FIG. 4B and to FIG. 4C, the comparison between these graphs may facilitate the understanding of distance dependency between the oscillation detector and the touched position for the output signal. It is to be noted that the unit for the vertical axis may use any unit, and the time on the horizontal axis does not represent absolute time, as the time axis is parallel translated as appropriate for ready understanding of the comparison between respective graphs.

As clearly seen in FIG. 4A, for the shorter distance between the oscillation detector and the touched position, such a trend can be observed in the output signal that due to an oscillatory wave being generated within the substrate 1 by an impact at the moment of touch, a significant output signal is present eccentrically for the initial moment, which is going to decay afterward over time. However, as clearly seen in FIG. 4C, for the longer distance between the oscillation detector and the touched position, the distribution profile for the output signal becomes broader with respect to time.

In other words, the envelope waveform of the output signal from the oscillation detector may vary in dependence on the distance between the oscillation detector and the touched position. This is because the propagation velocity of the oscillatory wave depends on the frequency, as explained above. Besides, since the oscillatory wave spreads over the substrate, it can also be observed in the comparison between FIGS. 4A, 4B, and 4C that the signal intensity tends to be smaller proportionally as the distance between the oscillation detector and the touched position increases.

On the other hand, FIGS. 5A-5C are graphical representations illustrating time dependency of an output signal from an oscillation detector (e.g., the first oscillation detector 2A) when a touch panel (substrate) is touched with a fingertip, specifically the ball of a finger), plotted with the output signal from the oscillation detector as the vertical axis and the time as the horizontal axis. The distance between the oscillation detector and the touched position increases in the sequence from FIG. 5A to FIG. 5B and to FIG. 5C. It is to be noted that the unit for the vertical axis may use any unit, and the time on the horizontal axis does not represent absolute time, as the time is parallel translated as appropriate for ready understanding of the comparison between respective graphs.

Comparing between FIG. 4A and FIG. 5A, between FIG. 4B and FIG. 5B, and between FIG. 4C and FIG. 5C, respectively, it can be observed for the touching with the ball of the finger that absolute values for the output signal are smaller and generally broader, as compared to the touching with the fingernail. In other words, it can be realized that depending on the material t used to make a touch, and also depending on the distance between the oscillation detector and the touched position, the waveform of the output signal may vary significantly.

In the conventional technologies for detecting the variation in the envelope waveform, it was difficult to provide a detection of an oscillatory wave in a consistent manner adaptively for such an output signal that may have a variety of characteristics. Particularly, as in FIG. 5C, when the absolute values for the signal are smaller and its waveform is broader, detecting the arrival of the oscillatory wave would be extremely difficult. In the present invention, the arrival of the oscillatory wave may be detected in the consistent manner even for such an output signal from the oscillation detector that may have a variety of characteristics.

Since the output signals from the oscillation detectors have been digitized and stored in the corresponding storage devices, those digitized output signals may be arithmetically processed to compute the STA/LTA ratios. In the following, a procedure for the arithmetic process will be described by using the graphs, specifically in FIG. 4C and FIG. 5C taken by way of example, in which the intensity of the output signal is small, thus having a great difficulty in detecting the arrival of the oscillatory wave.

FIG. 6A is a graphical representation illustrating time dependency of an absolute value for an output signal corresponding to that in FIG. 4C, plotted with the absolute value for the signal as the vertical axis and the time as the horizontal axis. Since the output signal from the oscillation detector has been converted into the digital signal by the high-speed A/D converter (e.g. the first high-speed A/D converter 4A) and stored in the storage device (e.g. the first storage device 5A), as described above, therefore the absolute value for the output signal may be computed by processing the data stored in the storage device in the arithmetic processor 6.

FIG. 6B is a graphical representation illustrating time dependency of the STA/LTA ratio computed from the data as illustrated in FIG. 6A, plotted with the STA/LTA ratio as the vertical axis and the time as the horizontal axis. It is to be noted that the STA/LTA ratio may be computed in the arithmetic processor 6. It can be observed that the STA/LTA ratio shows its values around 1 during the substrate being not touched, but once the substrate has been touched, the output signal varies and the STA/LTA ratio takes the values greater than 1.

FIG. 7A is a graphical representation illustrating time dependency of an absolute value for the output signal corresponding to that in FIG. 5C, plotted with the absolute value for the output signal as the vertical axis and the time as the horizontal axis. FIG. 7B is a graphical representation illustrating time dependency of the STA/LTA ratio computed from the data as illustrated in FIG. 7A, plotted with the STA/LTA ratio as the vertical axis and the time as the horizontal axis. The absolute values for the output signal in FIG. 7A are generally smaller, as compared to those in FIG. 6A. Consequently, the STA/LTA ratios during the substrate being touched are smaller in FIG. 7B as compared to FIG. 6B, but they are observed to have values well greater than 1. Also, considering the fact that the STA/LTA ratio shows its values nearly 1 during the substrate not being touched, it will be realized that the determination of the increase in the STA/LTA ratio will provide the detection of a touch the substrate.

In other words, it is possible to use the STA/LTA ratio as a criterion for determining the presence or the absence of touching even in the case of smaller output signal intensity due to the longer distance between the touched position and the oscillation detector as well as in the case of significantly varying waveform for the output signal due to different materials used for making a touch (i.e. touching with a fingernail or with the ball of a finger) and the like. It is needless to say that if the touched position is much closer to the oscillation detector, then the output signal intensity will be significant and thus the STA/LTA ratio will be much greater than 1, which will be eligible to be used as the criterion for determining the presence or the absence of touching.

Accordingly, a threshold, for example, a value in the range of 1.5 to 2.0, may be set beforehand and the STA/LTA ratios at respective times may be compared to the threshold in the arithmetic processor 6, wherein a particular time when the STA/LTA ratio has become greater than the threshold may be stored as the time when the oscillatory wave has arrived at the oscillation detector 2A, in the first storage device 5A.

It is needless to say that the above-described procedure for the arithmetic process may be applied to the output signals from the other oscillation detectors. Specifically, for the first, second, third and fourth oscillation detectors 2A, 2B, 2C, and 2D, the date for respective output signals may be stored in the first, second, third and fourth storage devices 5A, 5B, 5C, and 5D, and the absolute values for the respective output signals in the stored data may be computed, from which absolute values, the STA/LTA ratios will be computed and compared to the predetermined threshold, wherein each specific time when the STA/LTA ratio has become greater than the threshold can be stored as the time when the oscillatory wave has arrived at each specific oscillation detector, in each corresponding storage device.

It is to be noted that the first, second, third and fourth storage devices 5A, 5B, 5C, and 5D may share a single storage device, or may be incorporated in the arithmetic processor 6.

In this way, even in the case of the oscillatory wave generated by the touch having a wider spread in time (a broader waveform) and its intensity being smaller, it will still be possible to make a detection of the arrival time of the oscillatory wave as effectively separated from the background noise based on the STA/LTA ratio with the optimal cumulative time as being set, thereby avoiding the false detection. In other words, as will be realized, only with the simple four operations, such as arithmetic operation for calculating the STA/LTA ratio, any false detections of the touching can be effectively avoided.

It is to be noted that any types of sensor may be used for the oscillation detector which is capable of detecting an oscillatory wave on the substrate 1 and outputting it as an electric signal. For example, a microphone capable of detecting an acoustic wave on the substrate may be used, in addition to the acceleration sensor.

In the following description, will be explained a method for computing an amount of time required for the oscillatory wave to propagate from the touched position P to each of the oscillation detectors and the coordinates of the touched position P on the substrate 1 by using the arrival times (Ta, Tb, Tc, Td) at which the oscillatory wave has been detected at the respective oscillation detectors.

With the point A as the origin of coordinates as shown in FIG. 2, the coordinates of the points A, B, C, D, and P are expressed as (0, 0), (0, H), (W, 0), (W, H), and (x, y), respectively. With the propagation velocity of the oscillatory wave generated by the touching at the point P being denoted as V and the amount of time required for the oscillatory wave to reach from the point P to the points A, B, and C being denoted as $T_1$, $T_2$, and $T_3$, respectively, the following relational equations will be established. It is to be noted that the propagation velocity of the oscillatory wave, V, represents a group velocity, as the oscillatory wave generated by the touching is a combination of waves having a plurality of frequencies.

$$d1^2 = x^2 + y^2 = (VT_1)^2 \qquad \text{(eq. 1)}$$

$$d2^2 = x^2 + (y-H)^2 = (VT_2)^2 \qquad \text{(eq. 2)}$$

$$d3^2 = (x-W)^2 + y^2 = (VT_3)^2 \qquad \text{(eq. 3)}$$

It is to be noted that the $T_1$, $T_2$, and $T_3$ in themselves could not be directly measured but the differences between them can be computed from the measured values, so that the following relational equations will be established between the $T_1$, $T_2$, and $T_3$ and the Ta, Tb, and Tc.

$$T_1 - T_2 = Ta - Tb \qquad \text{(eq. 4)}$$

$$T_1 - T_3 = Ta - Tc \qquad \text{(eq. 5)}$$

therefore, $$T_2 = T_1 + Tb - Ta = T + \Delta t_1 \qquad \text{(eq. 6)}$$

$$T_3 = T_1 + Tc - Ta = T + \Delta t_2 \qquad \text{(eq. 7)}$$

It is to be noted that in the above equation, $T=T_1$, $\Delta t_1 = Tb - Ta$, $\Delta t_2 = Tc - Ta$ are put for simplicity.

With the propagation velocity already measured by a method as will be described below, the x, y, T and others will be computed by using the detection times Ta, Tb, and Tc from the above relational equations, as follows:

$$x = (W^2 - 2\Delta t_2 V^2 T - V^2 \Delta t_2^2)/(2W) \qquad \text{(eq. 8)}$$

$$y = (H^2 - 2\Delta t_1 V^2 T - V^2 \Delta t_1^2)/(2H) \qquad \text{(eq. 9)}$$

The T will be determined as a solution of the following quadratic equation 10.

$$\alpha T^2 + \beta T + \gamma = 0 \quad \text{(eq. 10)}$$

where, $$\alpha = 4V^2 H^2 W^2 - 4V^4(H^2 \Delta t_2{}^2 + W^2 \Delta t_1{}^2) \quad \text{(eq. 11)}$$

$$\beta = 4V^2 H^2 W^2 (\Delta t_2 + \Delta t_1) - 4V^4(H^2 \Delta t_2{}^3 + W^2 \Delta t_1{}^3) \quad \text{(eq. 12)}$$

$$\gamma = 2H^2 W^2 V^2 (\Delta t_2{}^2 + \Delta t_1{}^2) - V^4(H^2 \Delta t_2{}^4 + W^2 \Delta t_1{}^4) - H^2 W^2 (H^2 + W^2) \quad \text{(eq. 13)}$$

Therefore, the T will choose a solution to yield TA in the following equation 14:

$$T = (-\beta \pm (\beta^2 - 4\alpha\gamma)^{1/2})/(2\alpha) \quad \text{(eq. 14)}$$

By assigning the T obtained from the equation 14 into the equations 8 and 9, the coordinates of the P can be determined. Specifically, even when a special input stylus pen is not used and thus the amount of time required for an oscillatory wave to reach from the touched position to the oscillation detector could not be directly measured, it is still possible to compute the touched position from the detection times at three of the oscillation detectors. These calculations may be executed in the arithmetic processor 6.

It is to be noted that the measurement of the propagation velocity V of the oscillatory wave may be made through a preliminary calibration process (at the starting up of the coordinates detection device). To explain this, since the set-up conditions for respective oscillation detectors, such as the distance H between the points A and B as well as the distance W between the points A and C are already known, therefore for example, by making a touch with a stylus pen or a finger at the point A and measuring the times of a generated oscillatory wave being detected at the points A, B and C, the propagation times of the wave between the points A and B as well as the points A and C can be determined. From the determined propagation times, the propagation velocity of the wave between the points A and B and the propagation velocity between the points A and C will be computed, respectively, so that an average value of these two propagation velocities will be taken as the propagation velocity V of the wave. In addition, since the distance between the points A and can be expressed as $(H^2+W^2)^{1/2}$, the propagation velocity of the wave between the points A and D will be also computed, so that the average value may be computed from these three propagation velocities.

It is to be noted that further, the waveforms to be detected at the respective oscillation detectors may be extracted with different touching objects (a finger, a stylus pen, and the like) in order to prepare beforehand a plurality of settings for the cumulative time for the STA and the LTA, so that any particular setting as desired may be selected.

Besides, since the longest linear distance within the area encircled by the four oscillation detectors on the substrate 1 is an diagonal line or the distance between the points A and D, therefore the propagation time of the oscillatory wave between the points A and D would be a maximum value for the propagation time in this area. Consequently, if the value for the T (and $T_2$, $T_3$) previously computed according to the equation 14 is above this maximum value, then it is possible to determine the touched position to be outside the area. In other words, this determination by using the maximum value of the time can eliminate any unnecessary touch coordinates computations, thereby facilitating a rapid determination.

As described above, the detection times only at three oscillation detectors out of the first second, third and fourth oscillation detectors 2A, 2B, 2C, and 2D can cover the information required to compute the coordinates, and thus the coordinates computation may only use the detection times at those three oscillation detectors which have detected the arrival of the wave earlier.

It is to be noted that there will be four combinations for selecting the detection times at three oscillation detectors out of the first second, third, and fourth oscillation detectors 2A, 2B, 2C, and 2D. Accordingly, the coordinates of the point P, (x, y), can be computed by those four combinations, so that an average value of the respective coordinates obtained from the computational results by these four combinations may be taken. Specifically, although these four pairs of coordinate positions should be identical in an ideal situation, there will still be a chance that these four pairs of coordinates could not be exactly the same, due to variability among products, such as oscillation detectors, preamps, and AD converters, and so averaging these four computational results may serve to minimize the impact of errors in the measurements caused by the variability among the products and the like.

Further, in order to ensure the reliability of the data, a combination consisting of two of the obtained four pairs of coordinates that have similar distances to each other may be exclusively taken, so that an average of these two will be computed.

Still further, a variance may be computed for the four pairs of coordinates, and if a value for the variance is greater than a predetermined threshold, then it will be disposed as a detection error. It is to be noted that the variance may be computed as follows:

$$\Sigma\{(xi-xo)^2 + (yi-yo)^2\}/(xo^2 - yo^2)) \quad \text{(eq. 15)}$$

(where, $\Sigma$ represents the sum for i=1 to 4. Xo, Yo represents an average for Xi, Yi (i=1 to 4), respectively.)

The reliability of the data may be enhanced against the event of false detection which may be caused by any accident or unexpected disturbance, such as happening to touch at two locations concurrently, during detection of the coordinates.

Further, in case of detection error arisen in the STA/LTA ratio, the cumulative time for the STA and the cumulative time for the LTA may be automatically modified, so that the computing of the coordinates may be carried out again (recalculated) more than once. It is also possible to set the repetition of recalculation at three as default, which may be configured to be altered freely by a user.

It is to be noted that the substrate 1 comprised of a homogeneous material having a constant thickness may be any such substrate that is substantially homogenous and has a constant thickness. Specifically, the substrate is only required to ensure the propagation velocities of the oscillatory wave to be substantially same. For example, even in the case that the substrate has an inhomogeneous material or a varied thickness in an area that is smaller with respect to the position resolution (position coordinates detection precision) for determining a touched position, if the average values for the propagation velocities of the oscillatory wave within the extent governed by the position resolution are identical across the entire substrate 1, then, of course, not any problem will be arisen in detecting of the touched position.

Second Embodiment

It may also be possible to compute the times $T_1$, $T_2$, $T_3$, and $T_4$ required for the oscillatory wave to reach from the point P to the first, second, third, and fourth oscillation detectors 2A, 2B, 2C, and 2D, by using the arrival times Ta, Tb, Tc, and Td at the first, second, third, and fourth oscillation detectors 2A, 2B, 2C, and 2D. This method will be described below.

The distance from the point P to the point D may be expressed by the following equation 16 as:

$$d4=(x-W)^2+(y-H)^2=(VT_4)^2 \quad\quad (\text{eq. 16})$$

Solving the equations 1, 2, 3, and 16 simultaneously, the relation between the times $T_1$, $T_2$, $T_3$, and $T_4$ required for the oscillatory wave to reach from the point P to the points A, B, C, and D will be given as:

$$T_1^2+T_4^2=T_2^2+T_3^2 \quad\quad (\text{eq. 17})$$

Herein, the $T_4$ will be expressed by the following equation 18 as:

$$T_4=T_1+Td-Ta=T+\Delta t_3 \quad\quad (\text{eq. 18})$$

where, $\Delta t_3$=Td−Ta.

$T=T_1$ and the equations 6, 7, and 18 will be substituted into the equation 17, and then the time $T=T_1$ for the oscillatory wave to reach from the point P to the point A will be expressed as:

$$T=(\Delta t_3^2-\Delta t_1^2-\Delta t_2^2)/(2\Delta t_1+2\Delta t_2-2\Delta t_3) \quad\quad (\text{eq. 19})$$

Note that $\Delta t_1$=Tb−Ta, $\Delta t_2$=Tc−Ta, $\Delta t_3$=Td−Ta, as described above.

The equation 19 can be substituted into the equations 8 and 9 to compute the x and the y as:

$$x=\{(W^2-V^2\Delta t_2^2)(\Delta t_1+\Delta t_2-\Delta t_3)-\Delta t_2 V^2(\Delta t_3^2-\Delta t_1^2-\Delta t_2^2)\}/\{2W(\Delta t_1+\Delta t_2-\Delta t_3)\} \quad\quad (\text{eq. 20})$$

$$y=\{(H^2-V^2\Delta t_1^2)(\Delta t_1+\Delta t_2-\Delta t_3)-\Delta t_1 V^2(\Delta t_3^2-\Delta t_1^2-\Delta t_2^2)\}/\{2H(\Delta t_1+\Delta t_2-\Delta t_3)\} \quad\quad (\text{eq. 21})$$

In this way, by using the arrival times Ta, Tb, Tc, and Td at the first, second, third, and fourth oscillation detectors 2A, 2B, 2C, and 2D, the operations for computing the times $T_1$, $T_2$, $T_3$, and $T_4$ may require only the simple four operations, thus allowing for an accelerated processing as well as a simplified arithmetic processing program, leading to a reduced cost by building the system using an inexpensive microcomputer.

Third Embodiment

It may also be possible to compute all of the V, x, y, and T by using the arrival times Ta, Tb, Tc, and Td at the first, second, third, and fourth oscillation detectors 2A, 2B, 2C, and 2D. For example, the equation 10 may be substituted by the equation 19 and $Z=V^2$ may be put to give a quadratic equation related to the Z, so that any particular solution out of the solutions obtained from the quadratic equation that has a positive Z may be chosen and its square root can be taken. This can eliminate the measurement for computing previously the propagation velocity V.

Fourth Embodiment

Further, for respective triangles formed by the oscillation detectors located at respective apexes of the rectangle of substrate and the touched position coordinates, relations between the areas of the respective triangles may be considered so as to compute the touched position coordinates by using Heron's formula.

In the present embodiment, the substrate may be segmented into first to fourth quadrants, in each of which quadrants, the touched coordinates may be computed from the oscillatory wave detection times at three oscillation detectors. A method for computing the touched coordinates will be described below with reference to FIG. 8. In FIG. 8, the point O may be located at the intersection of diagonal lines of the rectangular of substrate ABCD, the point F at the midpoint of the side AC, the point F at the midpoint of the side AB, the point G at the midpoint of the side BD and the point J at the midpoint of the side CD.

As will be realized, for the touched position P, in case of an oscillation detector that has the earliest arrival time of the oscillatory wave is the oscillation detector 2A, the rectangular AFOE should contain the P, or in case of an oscillation detector that has the earliest arrival time of the oscillatory wave is the oscillation detector 2B, the rectangular BGOF should contain the P, or in case of an oscillation detector that has the earliest arrival time of the oscillatory wave is the oscillation detector 2C, the rectangular CEOJ should contain the P, or in case of an oscillation detector that has the earliest arrival time of the oscillatory wave is the oscillation detector 2D, the rectangular DJOG should contain the P.

Specifically, at first, one oscillation detector that has the earliest arrival time of the oscillatory wave may be discriminated and then, from the result of the discrimination, it will be further discriminated which quadrant contains the touched position P. Subsequently, the coordinates of the touched position P can be computed from the arrival times at said one oscillation detector that has the earliest arrival time of the oscillatory wave as well as at two other oscillation detectors adjacent to said one oscillation detector.

The following description is directed, by way of example, to the case of the oscillation detector having the earliest arrival time of the oscillatory wave that is the oscillation detector 2A, but the same may also be applied in the cases with the other oscillation detectors.

If the oscillation detector that has the earliest arrival time of the oscillatory wave is the oscillation detector 2A, then the two others adjacent to the oscillation detector 2A should be the oscillation detectors that have detected the oscillatory wave first and second following to the oscillation detector 2A, which are, in FIG. 8, the oscillation detectors 2B and 2C other than the oscillation detector 2D that is located in the diagonal direction to the oscillation detector 2A.

In the present embodiment, consideration will be made to the areas of respective triangles having the locations A, B, and C of these oscillation detectors 2A, 2B, and 2C and the touched position P at their apexes in order to computer the coordinates of the point P.

Firstly, the area of the triangle ABC can be computed as below:

$$[\text{the area of the triangle } ABC]=[\text{the area of the triangle } ABP]+[\text{the area of the triangle } ACP]+[\text{the area of the triangle } BCP] \quad\quad (\text{eq. 22})$$

Secondly, the areas of the following respective triangles will be computed as below:

$$[\text{the area of the triangle } ABC]=HW/2 \quad\quad (\text{eq. 23})$$

$$[\text{the area of the triangle } ABP]=yW/2 \quad\quad (\text{eq. 24})$$

$$[\text{the area of the triangle } ACP]=xH/2 \quad\quad (\text{eq. 25})$$

Further, the area of the triangle of BCP can be expressed according to Heron's formula as:

[the area of the triangle $BCP$] $= (1/4)$ (eq. 26)

$$\{(L+d2+d3)(-L+d2+d3)(L-d2+d3)(L+d2-d3)\}^{1/2} =$$
$$(1/4)\{((d2+d3)^2-L^2)(L^2-(d2-d3)^2)\}^{1/2}$$

where, L denotes the length of the side BC.

In this equation, with $L=(W^2+H^2)^{1/2}$, the difference between the d2 and the d1 and the difference between the d3 and the d1 can be determined by a product of the oscillatory wave arrival time difference multiplied by the propagation velocity as:

$$d2-d1=V(Tb-Ta)=V\Delta t_1$$

$$d3-d1=V(Tc-Ta)=V\Delta t_2$$

Note that the propagation velocity of the oscillatory wave can be previously measured, as stated above.

The equations 23, 24, and 25 will be substituted into the equation 22, which will be arranged to give the following equation:

$$4(HW-yW-xH)^2=\{((2d1+V\Delta t_1+V\Delta t_2)^2-(W^2+H^2)) \\ ((W^2-H^2)-(V\Delta t_1-V\Delta t_2)^2)\}$$ (eq. 27)

Besides, as for the area of the triangle ACP, the following will be established according to Heron's formula:

$$xH/2 =$$
$$(1/4)\{(H+d1+d2)(-H+d1+d2)(H-d1+d2)(H+d1-d2)\}^{1/2} =$$
$$(1/4)\{((d1+d2)^2-H^2)(H^2-(d1-d2)^2)\}^{1/2}$$

and thus, $$4(xH)^2 = ((d1+d2)^2-H^2)(H^2-(d1-d2)^2) =$$
$$((2d1+V\Delta t_1)^2-H^2)(H^2+V^2\Delta t_1^2)$$

From the relation between the d2 and the d1, the following will be given:

$$(2d1+V\Delta t_1)^2=4(xH)^2/(H^2-V^2\Delta t_1^2)+H^2$$ (eq. 28)

Similarly, as for the area of the triangle ABP, the following will be established according to Heron's formula:

$$yW/2 =$$
$$(1/4)\{(W+d1+d3)(-W+d1+d3)(W-d1+d3)(W+d1-d3)\}^{1/2} =$$
$$(1/4)\{((d1+d3)^2-W^2)(W^2-(d1-d3)^2)\}^{1/2}$$

and thus, the following equation will be given:

$$(2d1+V\Delta t_2)^2=4(yW)^2/(W^2-V^2\Delta t_2^2)+W^2$$ (eq. 29)

The sum of the equations 28 and 29 will be taken and arranged to give the following equation:

$$(2d1+V\Delta t_1+V\Delta t_2)^2=4(xH)^2/(H^2-V^2\Delta t_1^2)+4(yW)^2/(W^2-V^2\Delta t_2^2)+H^2+W^2-4d1^2+2V^2\Delta t_1\Delta t_2$$ (eq. 30)

The equation 30 is substituted into the equation 27, which will be arranged as follows, with $d1^2=x^2+y^2$:

$$(HW-yW-xH)^2=\{((xV\Delta t_1)^2/(H^2-V^2\Delta t_1^2)+(yV\Delta t_2)^2/ \\ (W^2-V^2\Delta t_2)+V^2\Delta t_1\Delta t_2/2)((W^2+H^2)-(V\Delta t_1-V\Delta t_2)^2)\}$$

In the above equation, the following will be put:

$$\alpha=(V\Delta t_1)^2/(H^2-V^2\Delta t_1^2)$$ (eq. 31)

$$\beta=(V\Delta t_2)^2/(W^2-V^2\Delta t_2^2)$$ (eq. 32)

$$\gamma=(W^2+H^2)-(V\Delta t_1-V\Delta t_2)^2$$ (eq. 33)

$$\xi=V^2\Delta t_1\Delta t_2/2$$

and the equation will be arranged as:

$$(\alpha\gamma-H^2)x^2+(\beta\gamma-W^2)y^2+2H^2Wx+2HW^2y-2WHxy+\xi\gamma-H^2W^2=0$$ (eq. 34)

Herein, as for the side CP, the following will be established according to the Pythagorean theorem:

$$d2^2 = x^2+(H-y)^2 = (d1+V\Delta t_1)^2$$

wherein, since $d1^2=x^2+y^2$, therefore $$d1=(H^2-2yH-V^2\Delta t_1^2)/(2V\Delta t_1)$$ (eq. 35)

Similarly, as for the side BP, the following will be established according to the Pythagorean theorem:

$$d3^2 = (x-W)^2+y^2 = (d1+V\Delta t_2)^2$$

wherein, since $d1^2=x^2+y^2$, therefore $$d1=(W^2-2xW-V^2\Delta t_2^2)/(2V\Delta t_2)$$ (eq. 36)

Since the equation 35 is equal to the equation 36, therefore $$x=\{(HV\Delta t_2)/(WV\Delta t_1)\}y+(W^2\Delta t_1-H^2\Delta t_2+V^2\Delta t_2\Delta t_1^2- \\ V^2\Delta t_2^2\Delta t_1)/(2W\Delta t_1)$$ (eq.37)

$$y=\{(WV\Delta t_1)/(HV\Delta t_2)\}x+(H^2\Delta t_2-W^2\Delta t_1-V^2\Delta t_2\Delta t_1^2+ \\ V^2\Delta t_2^2\Delta t_1)/(2H\Delta t_2)$$ (eq. 38)

The equation 37 or the equation 38 will be substituted into the equation 34, and then the coordinates of the point P will be given by selecting, as the solution of the quadratic equation for the x or the y, a solution that can satisfy the following conditions for the quadrant that can contain the point P:

$$0<x<W/2$$ (eq. 39)

$$0<y<H/2$$ (eq. 40)

Thus, the computation of the touched position coordinates may also be accomplished by using Heron's formula, which allows the touched position coordinates to be computed in each quadrant, thereby enhancing the reliability in the detection of the touched position coordinates. It is needless to say that these calculation processes may be executed in said arithmetic processor 6.

Fifth Embodiment

In another embodiment of the method for detecting the touched position, a plurality of modules, each comprised of three oscillation detectors, may be disposed at two opposite ends of a side of the substrate, wherein incident angles of the oscillatory wave from a touched position admitting into respective modules will be computed, so that the position coordinates can be computed from the intersection of two straight lines passing through the respective modules and the touched position. Specifically, in the fifth embodiment, the modules, each comprised of a set of three oscillation detectors, act as incident (admittance) direction detecting modules for the oscillatory wave, so that the touched position coordinates may be detected from two pieces of information on the incident directions. The present module will be hereinafter referred to as the incident direction detecting module.

FIG. 9 illustrates relations between the locations A, Ax, and Ay of three oscillation detectors constructing a first incident direction detecting module and a first angle θ with respect to the line from the point A to the point P of touched position, as well as between the locations B, Bx, and By of three oscillation detectors constructing a second incident direction detecting module and a second angle ψ with respect to the line from the point B to the point P of touched position. In this connection, the oscillation detectors located at the points A, Ax, Ay, B, Bx, and By will be indicated by the reference signs 2A, 2Ax, 2Ay, 2B, 2Bx, and 2By, respectively.

The distance from the point A to the point Ax, from the point A to the point Ay is denoted as s, and the distance from the point B to the point Bx, from the point B to the point By is also denoted as s. Specifically three respective oscillation detectors constructing respective incident direction detecting modules are located each at one of the apexes of a first and a second isosceles right triangle having the same dimensions but in the laterally inverted relation to each other on the drawing and disposed such that the first and second isosceles right triangles form adjacent corners of one rectangle. Further, the first angle θ and the second angle ψ are made by the side connecting the adjacent corners of the rectangle and the straight line from the point A to the point of touched position P and by said side connecting the adjacent corners of the rectangle and the straight line from the point B to the point of touched position P, respectively.

A method for computing an angle (gradient) for an oscillatory wave to admit into the first and second incident direction detecting modules will be described below. It is to be assumed that the dimension of the s should be quite small as compared to the distance from the point A to the point P and to the distance from the point B to the point P.

Firstly, considering the triangle AAxP, the following will be established according to the cosine theorem:

$$\alpha^2=\beta^2+s^2-2s\beta\cos(\theta) \quad (\text{eq. 41})$$

where, α=[the length from the point P to the point Ax] and β=[the length from the point P to the point A].

A difference between the distances α and β is a product of a difference of the times when the oscillatory wave has arrived at the oscillation detectors 2A and 2B multiplied by the propagation velocity of the oscillatory wave, wherein the arrival times can be detected by whether or not the STA/LTA ratio has exceeded the threshold, as described above. Accordingly, the difference between the distances α and β should be a known value that is measurable from the output signals from the oscillation detectors, and said difference is denoted as δx to express the following equation:

$$\alpha=\beta-\delta x \quad (\text{eq. 42})$$

The equation 42 will be substituted into the equation 41, which will be arranged as:

$$\alpha^2=\beta^2+s^2-2s\beta\cos(\theta)$$

$$2s\beta\cos(\theta)=2\beta\delta x+s^2-\delta x^2$$

whose both sides will be further divided by 2β² to give the following equation:

$$(s/\beta)\cos(\theta)=\delta x/\beta+(s/\beta)^2-(\delta x/\beta)^2 \quad (\text{eq. 43})$$

Since the dimension of the δx should be at most as great as s, therefore if s<<β, then δx<<β. Thus, the squared term for the s/β and the δx/β will be ignored to give the expression as:

$$(s/\beta)\cos(\theta)=\delta x/\beta$$

and, thus, $$\cos(\theta)=\delta x/s \quad (\text{eq. 44})$$

Specifically, the cos(θ) can be approximated as a value for the difference between [the length from the point P to the point A] and [the length from the point P to the point Ax] divided by [the length from the point A to the point Ax].

In connection with the first incident direction detecting module, secondly, the triangle AAyP will be considered, and since the angle between the side AP and the side AC is (π/2)−θ, therefore based on the result as described above, cos((π/2)−θ) should be equal to a value for the difference between [the length from the point P to the point A] and [the length from the point P to the point Ay] divided by [the length from the point A to the point Ay]. Accordingly, the difference between [the length from the point P to the point A] and [the length from the point P to the point Ay] as denoted as δy will be approximated as:

$$\cos((\pi/2)-\theta)=\sin(\theta)=\delta y/s \quad (\text{eq. 45})$$

According to the equations 44 and 45, the gradient of the straight line AP, tan(θ), will be expresses as:

$$\tan(\theta)=\sin(\theta)/\cos(\theta)=(\delta y/s)/(\delta x/s)=\delta y/\delta x \quad (\text{eq. 46})$$

Specifically, the tan(θ) can be approximated as a value for the difference between [the length from the point P to the point A] and [the length from the point P to the point Ay] divided by the difference between [the length from the point P to the point A] and [the length from the point P to the point Ax].

In this regard, the difference between [the length from the point P to the point A] and [the length from the point P to the point Ay] is a difference of the times when the oscillatory wave has arrived at the oscillation detectors 2A and 2Ay multiplied by the propagation velocity of the oscillatory wave, and the difference between [the length from the point P to the point A] and [the length from the point P to the point Ax] is a difference of the times when the oscillatory wave has arrived at the oscillation detectors 2A and 2Ax multiplied by the propagation velocity of the oscillatory wave.

Given that the propagation velocity of the oscillatory wave is common, and the arrival times of the oscillatory wave at the oscillation detectors 2A, 2Ax, and 2Ay denoted as Ta, Tax, and Tay, respectively, then the following expression will be given:

$$\tan(\theta)=(Ta-Tay)/(Ta-Tax) \quad (\text{eq. 47})$$

Accordingly, the incident direction of the oscillatory wave can be readily determined by computing the ratio of the differences between the arrival times of the oscillatory wave at the respective oscillation detectors.

Likewise, as for the second incident direction detecting module, using the arrival times of the oscillatory wave at the oscillation detectors 2B, 2Bx, and 2By denoted as Tb, Tbx, and Tby, respectively, the gradient tan(ψ) will be approximated as:

$$\tan(\psi)=(Tb-Tby)/(Tb-Tbx) \quad (\text{eq. 48})$$

Thus, the gradients of the straight lines from the first and second incident direction detecting modules to the touched position can be readily measured simply from the oscillatory wave arrival times at the respective oscillation detectors, thereby further eliminating the measurement of the propagation velocity of the oscillatory wave.

The description will now be directed to a method for computing touched position coordinates from the incident angles (gradients).

Since respective coordinates of the first and second incident direction detecting modules can be determined at the apexes forming the right angles of the first and second isosceles right triangles, the coordinates of the A and the coordinates of the B will be used to compute the touched position coordinates P.

Denoting the coordinates of the A as (0, 0), the coordinates of the B as (W, 0) and the coordinates of touched position P as (x, y), the point P that is on the straight line AP will satisfy the following:

$$y=\tan(\theta)x \quad \text{(eq. 49)}$$

Further, the point P that is on the straight line BP will satisfy the following:

$$y=-\tan(\psi)(x-W) \quad \text{(eq. 50)}$$

Thus, the coordinates (x, y) of the point P will be expressed as:

$$x=W\tan(\psi)/(\tan(\theta)+\tan(\psi)) \quad \text{(eq. 51)}$$

$$y=W\tan(\psi)\tan(\theta)/(\tan(\theta)+\tan(\psi)) \quad \text{(eq. 52)}$$

which coordinates of touched position will be readily computed by the simple four operations.

In the present embodiment, while precision of detected coordinates might be deteriorated, calculation load can be significantly reduced, allowing for extremely accelerated processing of the coordinates detection as well as a simplified arithmetic processing program, thus enabling the system to be built by using an inexpensive microcomputer.

It is to be noted that as for the triangle AAyP, an equation corresponding to the equation 43 should be obtained and satisfied simultaneously with the equation 43 so as to compute the relational expression with the $\cos(\theta)$ and the $\sin(\theta)$, which may be in turn satisfied simultaneously with $\cos^2(\theta)+\sin^2(\theta)=1$, so that by solving the quadratic equation, the accurate gradient $\tan(\theta)$ can be computed, and so does the $\tan(\psi)$, thus allowing for the accurate coordinates of touched position P to be computed only by providing the two incident direction detecting modules, yet with rather lowered coordinates detection speed.

In the present embodiment, the first incident direction detecting module and the second incident direction detecting module should be located such that they are located apart by a predetermined distance on the substrate with the points A, Ax, Bx, and B aligned on the same straight line as well as the direction from the point A toward the point Ay set in the same orientation with the direction from the point B toward the point By, specifically the isosceles right triangles provided with the oscillation detectors of two incident direction detecting modules forming adjacent corners of one rectangle, A measurable area for the touched position would be a rectangular area defined between the two modules. It would be specifically the area sandwiched between the straight line extended from the point A along the direction of Ay, the straight line extended from the point B along the direction of By and the side AB, in FIG. 9. This may increase degrees of freedom for locations where the modules of oscillation detectors can be placed, as compared to the other embodiments.

Further, it is needless to say that in the present embodiment, six AD converters may be used to AD convert outputs from the six oscillation detectors as described above and that the arithmetic operation for computing the coordinates of the point P may be executed in the arithmetic processor 6 as described above.

Sixth Embodiment

The present invention is not only applicable to the substrate 1 comprising a flat surface but also to the substrate 1 comprising a curved surface as far as it provides the constant propagation velocity of the oscillatory wave. For example, on a spherical surface, the shortest path between two points is on the great circle and so polar coordinates may be used to compute a touched position easily.

In other words, if the substrate 1 is a part of the spherical surface having a radius R and provided with the first, second, third, and fourth oscillation detectors 2A, 2B, 2C, and 2D located at the points A, B, C, and D on the spherical surface, then the coordinates of a touched position within the area encircled by those oscillation detectors can be computed by at least three of them. Specifically, the distances d1, d2, and d3 from the P to the three respective oscillation detectors may be computed on the spherical surface and then assigned to the equations 1, 2, and 3, so that the $T_1$, $T_2$, and $T_3$ and the P coordinates would be computed by solving the simultaneous equations.

In computing a distance between two points, for example, the distance d1 between the point P and the point A, when an angle made by two vectors from the center of sphere in the directions toward the P and A may be denoted as $\varphi$(radian), then $d1=R\varphi$.

The $\varphi$ can be computed from an inverse function of cos, because an inner product of said two vectors from the center of sphere in the directions toward the P and A divided by the distance from the origin to the P and the distance from the origin to the A would be equal to $\cos\varphi$. The other distances can be similarly computed, and thus the present invention can also be applied on the spherical surface.

The present invention may be further applicable to a general curved surface having a known curvature of the substrate 1, by determining the shortest path between two points by a geodesic equation.

REFERENCE SINGS LIST

1: Substrate
2A, 2B, 2C, 2D: First, second, third, and fourth oscillation detectors
3A, 3B, 3C, 3D: First, second, third, and fourth preamps
4A, 4B, 4C, 4D: First, second, third, and fourth high-speed A/D converters
5A, 5B, 5C, 5D: First, second, third, and fourth storage devices
6: Arithmetic processor

The invention claimed is:

1. A coordinates detection method including the following steps:
respectively determining a STA/LTA ratio to each of output signals from at least three oscillation detectors located apart from each other by a predetermined distance on a substrate, the STA/LTA ratio representing a ratio of a short term average to a long term average, wherein the short term average has a first predetermined cumulative time and the long term average has a second predetermined cumulative time that is longer than the first predetermined cumulative time as being set;

respectively determining from an oscillatory wave generated by touching said substrate, a time when each of said STA/LTA ratios of said at least three oscillation detectors has exceeded a predetermined threshold; and determining touched position coordinates from said respective times, a propagation velocity of said oscillatory wave, and information on locations of said at least three oscillation detectors, wherein the first predetermined cumulative time for the short term average and the second predetermined cumulative time for the long term average are set such that the STA/LTA ratio at a time of touching the substrate exceeds the predetermined threshold, and wherein the first predetermined cumulative time and the second predetermined cumulative time are set based upon at least a material thickness of the substrate and a layout of the at least three oscillation detectors, the layout comprising positions of the at least three oscillation detectors relative to one another.

2. The coordinates detection method according to claim 1, further including a step of:
determining said propagation velocity of said oscillatory wave before the determination of the STA/LTA ratio with said at least three oscillation detectors.

3. The coordinates detection method according to claim 2, wherein an optimal cumulative time for said short term average and said long term average is configured to be automatically set through calibration.

4. The coordinates detection method according to claim 3, wherein a plurality of different cumulative times is prepared for said short term average and said long term average before the determination of the STA/LTA ratio, so that the touched position coordinates, which correspond to various cumulative times, may be computed, depending on an output result by said touching.

5. The coordinates detection method of claim 1, wherein the at least three oscillation detectors comprise four oscillation detectors; and
respectively determining, from each of said times, a required time taken for said oscillatory wave to reach from a touched position to each of said four oscillation detectors; and
determining the touched position coordinates from said respective required times, the propagation velocity of said oscillatory wave, and the information on the locations of three out of said four oscillation detectors.

6. A coordinates detection method including the following steps:
respectively determining a STA/LTA ratio to each of output signals from four oscillation detectors located apart from each other by a predetermined distance on a substrate, the STA/LTA ratio representing a ratio of a short term average to a long term average, wherein the short term average has a first predetermined cumulative time and the long term average has a second predetermined cumulative time that is longer than the first predetermined cumulative time as being set;
respectively determining from an oscillatory wave generated by touching said substrate, a time when each of said STA/LTA ratios of said four oscillation detectors has exceeded a predetermined threshold;
respectively determining, from each of said times, a required time taken for said oscillatory wave to reach from a touched position to each of said four oscillation detectors; and
determining touched position coordinates from said respective required times and information on locations of said four oscillation detectors, wherein determining the touched position coordinates further includes:
discriminating, based on said times, one among said four oscillation detectors at which said oscillatory wave has arrived earliest;
discriminating a quadrant of a rectangle that contains as an apex the location of said one oscillation detector at which said oscillatory wave has arrived earliest; and
selecting three out of said four oscillation detectors according to a sequence of said times when the oscillatory wave has arrived, and determining the touched position coordinates from the locations where said three oscillation detectors are located and the times when said three oscillation detectors detect the oscillatory wave.

7. A coordinates detection method including the following steps:
respectively determining a STA/LTA ratio to an output signal from each of oscillation detectors in a first incident direction detecting module and a second incident direction detecting module located apart from each other by a predetermined distance on a substrate, the STA/LTA ratio representing a ratio of a short term average to a long term average, wherein each of the short term average and the long term average has its own predetermined cumulative time as being set, each of said first and second incident direction detecting modules being comprised of three oscillation detectors;
respectively determining from an oscillatory wave generated by touching said substrate a time when each of said STA/LTA ratios for said three respective oscillation detectors in said first and second respective incident direction detecting modules has exceeded a predetermined threshold;
respectively computing, from each of said times, first and second angles for an incidence of said oscillatory wave upon said first and second incident direction detecting modules; and
computing touched position coordinates from said first and second angles and the coordinates of said first and second incident direction detecting modules.

8. The coordinates detection method according to claim 7, including the following steps:
a step of computing arrival times at said three oscillation detectors located at apexes of a first isosceles right triangle constructing said first incident direction detecting module;
a step of respectively computing a difference between said arrival time at the oscillation detector located at the apex forming a right angle of said first isosceles right triangle and said arrival time at one of the other oscillation detectors located at one of two other apexes of said first isosceles right triangle, and a difference between said arrival time at the oscillation detector located at the apex forming the right angle and said arrival time at another of the other oscillation detectors located at the other of the two other apexes of said first isosceles right triangle, and computing from a ratio of the two differences of said arrival times said first angle for the incidence of said oscillatory wave upon said first incident direction detecting module;

a step of computing arrival times at said three oscillation detectors located at apexes of a second isosceles right triangle constructing said second incident direction detecting module;

a step of respectively computing a difference between said arrival time at the oscillation detector located at an apex forming a right angle of said second isosceles right triangle and said arrival time at one of the other oscillation detectors located at one of two other apexes of said second isosceles right triangle, and a difference between said arrival time at the oscillation detector located at the apex forming the right angle and said arrival time at another of the other oscillation detectors located at the other of the two other apexes of said second isosceles right triangle, and computing from a ratio of said two differences of said arrival times said second angle for the incidence of said oscillatory wave upon said second incident direction detecting module; and a step of computing the touched position coordinates from said first and second angles and the coordinates of said first and second incident direction detecting modules.

9. The coordinates detection method according to claim 1, wherein said substrate comprises a curved surface having a predetermined curvature.

10. The coordinates detection method according to claim 1, wherein said step of respectively determining said time when said predetermined threshold has been exceeded includes the following step:

determining that the touching has occurred if said predetermined threshold has been exceeded for a certain period of time, wherein a time going back by said certain period of time from a current time is derived as the time when the touching has occurred.

11. A coordinates detection device configured to be placed on a substrate to detect coordinates on said substrate, said device comprising:

at least three oscillation detectors located apart by a predetermined distance on said substrate;

A/D converters to respectively convert output signals from said oscillation detectors into digital signals; and an arithmetic processor, wherein said arithmetic processor includes:

an arithmetic processing unit for determining a STA/LTA ratio representing a ratio of a short term average to a long term average, wherein the short term average has a first predetermined cumulative time and the long term average has a second predetermined cumulative time that is longer than the first predetermined cumulative time as being set;

a time measuring unit for respectively determining from an oscillatory wave generated by touching said substrate, a time when each of said STA/LTA ratios of said at least three oscillation detectors has exceeded a threshold; and a coordinates determining unit for determining touched position coordinates from each of said times, a propagation velocity of said oscillatory wave, and information on locations of said at least three oscillation detectors, wherein the first predetermined cumulative time for the short term average and the second predetermined cumulative time for the long term average are set such that the STA/LTA ratio at a time of touching the substrate exceeds the threshold, and wherein the first predetermined cumulative time and the second predetermined cumulative time are set based upon at least a material thickness of the substrate and a layout of the at least three oscillation detectors, the layout comprising positions of the at least three oscillation detectors relative to one another.

12. A coordinates detection device configured to be placed on a substrate to detect coordinates on said substrate, said device comprising:

first and second incident direction detecting modules placed on said substrate, said first incident direction detecting module comprised of three oscillation detectors positioned at apexes of a first isosceles right triangle and said second incident direction detecting module comprised of three oscillation detectors positioned at apexes of a second isosceles right triangle;

A/D converters to respectively convert each of output signals from said oscillation detectors into digital signals; and an arithmetic processor, wherein said first isosceles right triangle in which said three oscillation detectors of said first incident direction detecting module are placed and said second isosceles right triangle in which said three oscillation detectors of said second incident direction detecting module are placed are respectively located at adjacent corners of one rectangle, and wherein said arithmetic processor includes:

an arithmetic processing unit for determining a STA/LTA ratio representing a ratio of a short term average to a long term average, wherein each of the short term average and the long term average has its own predetermined cumulative time as being set;

a time measuring unit for determining from an oscillatory wave generated by touching said substrate, a time when said STA/LTA ratio of each of said oscillation detectors constructing said first and second incident direction detecting modules has exceeded a threshold; and a coordinates determining unit for determining touched position coordinates from each of said times and coordinates of said first and second incident direction detecting modules.

13. The coordinates detection method according to claim 1, wherein an optimal cumulative time for said short term average and said long term average is configured to be automatically set through calibration.

14. The coordinates detection method according to claim 4, wherein said step of respectively determining said time when said predetermined threshold has been exceeded includes the following step:

determining that the touching has occurred if said predetermined threshold has been exceeded for a certain period of time, wherein a time going back by said certain period of time from a current time is derived as the time when the touching has occurred.

15. The coordinates detection method according to claim 5, wherein said step of respectively determining said time when said predetermined threshold has been exceeded includes the following step:

determining that the touching has occurred if said predetermined threshold has been exceeded for a certain period of time, wherein a time going back by said certain period of time from a current time is derived as the time when the touching has occurred.

16. The coordinates detection method according to claim 6, wherein said step of respectively determining said time when said predetermined threshold has been exceeded includes the following step:

determining that the touching has occurred if said predetermined threshold has been exceeded for a certain period of time, wherein a time going back by said certain period of time from a current time is derived as the time when the touching has occurred.

17. The coordinates detection method according to claim 4, wherein said substrate comprises a curved surface having a predetermined curvature.

18. The coordinates detection method according to claim 6, wherein said substrate comprises a curved surface having a predetermined curvature.

* * * * *